US008437035B2

(12) United States Patent
Negishi

(10) Patent No.: US 8,437,035 B2
(45) Date of Patent: May 7, 2013

(54) PRINTING APPARATUS, CONTROL METHOD OF PRINTING APPARATUS, AND STORAGE MEDIUM

(75) Inventor: Akira Negishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1195 days.

(21) Appl. No.: 12/166,968

(22) Filed: Jul. 2, 2008

(65) Prior Publication Data

US 2009/0009783 A1 Jan. 8, 2009

(30) Foreign Application Priority Data

Jul. 3, 2007 (JP) ................................ 2007-175296

(51) Int. Cl.
*G06F 15/00* (2006.01)

(52) U.S. Cl.
USPC .............................. 358/1.9; 358/1.1; 358/1.5

(58) Field of Classification Search .................. 358/1.1, 358/1.2, 1.5, 1.9, 1.12, 400, 401, 406, 504
See application file for complete search history.

(56) References Cited

U.S. PATENT DOCUMENTS

2005/0248738 A1* 11/2005 Minami ......................... 355/29

FOREIGN PATENT DOCUMENTS

JP 09331415 A 12/1997
JP 2002-337433 A 11/2002

* cited by examiner

*Primary Examiner* — Thomas D Lee
(74) *Attorney, Agent, or Firm* — Canon USA Inc IP Division

(57) ABSTRACT

A user can easily tell whether image position adjustment is being appropriately performed for accommodating units in which printing media is accommodated. A printing method for controlling a printing apparatus so as to cause a printing unit to print on a sheet fed from a sheet accommodation unit, includes: accepting input of an adjustment value for image adjustment for a sheet accommodated in the sheet accommodation unit; causing the printing unit to print an image adjusted according to the accepted adjustment value; and in a case where adjustment is necessary for a sheet accommodated in the sheet accommodation unit, prompting input of the adjustment value.

22 Claims, 17 Drawing Sheets

FIG. 9

| SHEET FEED UNIT (902) | # (903) | X1 | Y1 | X2 | Y2 | SHEET SIZE (905) | SHEET TYPE (906) | DATE-AND-TIME OF ADJUSTMENT (907) | STATE FOLLOWING LAST ADJUSTMENT (908) |
|---|---|---|---|---|---|---|---|---|---|
| SHEET FEED UNIT 1 | 1 | −1 | 0 | +2 | −1 | A4 | PLAIN COPY PAPER | 11/10/2006 10:45 | NOT OPENED |
| | 2 | 0 | −1 | −1 | −2 | A4 | PLAIN COPY PAPER | 11/8/2006 16:23 | |
| | 3 | +2 | −2 | +3 | −2 | A3 | HEAVY PAPER | 10/23/2006 11:22 | |
| SHEET FEED UNIT 2 | 1 | +1 | −1 | 0 | −1 | A3 | HEAVY PAPER | 11/8/2006 13:22 | OPENED |
| | 2 | +2 | −2 | +1 | +2 | A4 | PLAIN COPY PAPER | 11/1/2006 18:39 | |
| | 3 | +2 | +2 | −1 | −1 | 12×18 | HEAVY PAPER | 10/12/2006 15:16 | |
| SHEET FEED UNIT 3 | 1 | −1 | 0 | +2 | −1 | A4 | PLAIN COPY PAPER | 11/4/2006 9:31 | CHANGED |
| | 2 | +1 | +3 | −1 | 0 | A4 | PLAIN COPY PAPER | 10/2/2006 8:52 | |
| | 3 | 0 | 0 | 0 | 0 | – | – | – | |
| SHEET FEED UNIT 4 | 1 | 0 | 0 | 0 | 0 | – | – | – | – |
| | 2 | 0 | 0 | 0 | 0 | – | – | – | |
| | 3 | 0 | 0 | 0 | 0 | – | – | – | |
| SHEET FEED UNIT 5 | 1 | −3 | +3 | −2 | +1 | A4 | THIN PAPER | 11/3/2006 13:30 | CHANGED |
| | 2 | 0 | 0 | 0 | 0 | – | – | – | |
| | 3 | 0 | 0 | 0 | 0 | – | – | – | |

FIG. 10

| SHEET FEED UNIT (1002) | SHEET SIZE (1003) | SHEET TYPE (1004) | STATE OF ADJUSTMENT (1005) | REUSE INFORMATION (1006) |
|---|---|---|---|---|
| SHEET FEED UNIT 1 | A4 | PLAIN COPY PAPER | 3 | 0–0 |
| SHEET FEED UNIT 2 | A3 | HEAVY PAPER | 3 | 0–0 |
| SHEET FEED UNIT 3 | A4 | PLAIN COPY PAPER | 2 | 3–2 |
| SHEET FEED UNIT 4 | A4 | RECYCLED PAPER | 1 | 0–0 |
| SHEET FEED UNIT 5 | A4 | PLAIN COPY PAPER | 2 | 1–1 |

PRINTING APPARATUS, CONTROL METHOD OF PRINTING APPARATUS, AND STORAGE MEDIUM

BACKGROUND OF THE INVENTION

1. Field of the Invention

The present invention relates to a printing apparatus including multiple sheet accommodation units, a control method of the printing apparatus, and a storage medium.

2. Description of the Related Art

There has been known a printing system wherein adjustment values are set for a sheet feed unit serving as a sheet accommodation unit of sheets, wherein image position adjustment can be performed based on the adjustment values (See Japanese Patent Laid-Open No. 2002-337433). Such a printing system prints an adjustment page which the user uses for image position adjustment. The user sets adjustment values used for image position adjustment with regard to the sheet feed unit of the printing system. The printing system then adjusts the position of images printed, in accordance with the adjustment value set with regard to the sheet feed unit.

Accordingly, the user can obtain printed articles suitably adjusted to where the printing position is at the center of the printing sheet. Particularly, POD (Print On Demand) applications of printing systems demand high-precision image position adjustment, since the printed article itself is merchandise.

However, with this known technique, the user has not been able to readily know whether or not image position adjustment is being suitably performed as to an accommodation unit where printing media is accommodated.

SUMMARY OF THE INVENTION

The present invention provides printing apparatus and a control method of the printing apparatus, which overcomes the above-described problems.

According to one aspect of the present invention, provided is a printing apparatus for causing a printing unit to print on a sheet fed from a sheet accommodation unit, including: an accepting unit configured to accept input of an adjustment value for image adjustment for sheets accommodated in the sheet accommodation unit; a print control unit configured to cause the printing unit to print an image adjusted according to the adjustment value accepted by the accepting unit; and a prompting unit configured to, in a case where adjustment is necessary for a sheet accommodated in the sheet accommodation unit, prompt input of the adjustment value.

Further features of the present invention will become apparent from the following description of exemplary embodiments with reference to the attached drawings.

BRIEF DESCRIPTION OF THE DRAWINGS

FIG. 9 is a diagram for describing an adjustment information table to be controlled in the embodiment.

FIG. 10 is a flowchart for describing an example of control procedures according to the embodiment.

DESCRIPTION OF THE EMBODIMENTS

Embodiments of the present invention will be described in detail with reference to the drawings.

First Embodiment

First, a printing environment 10000 including a printing system 1000 will be described with reference to FIG. 1. With the present embodiment, the printing environment 10000 is applicable to a POD environment, and accordingly will be referred to as a "POD system" 10000. Also, the printing system 1000 will be exemplarily described as a printing system, and a printing apparatus 100 will be exemplarily described as a printing apparatus.

Figure 1:
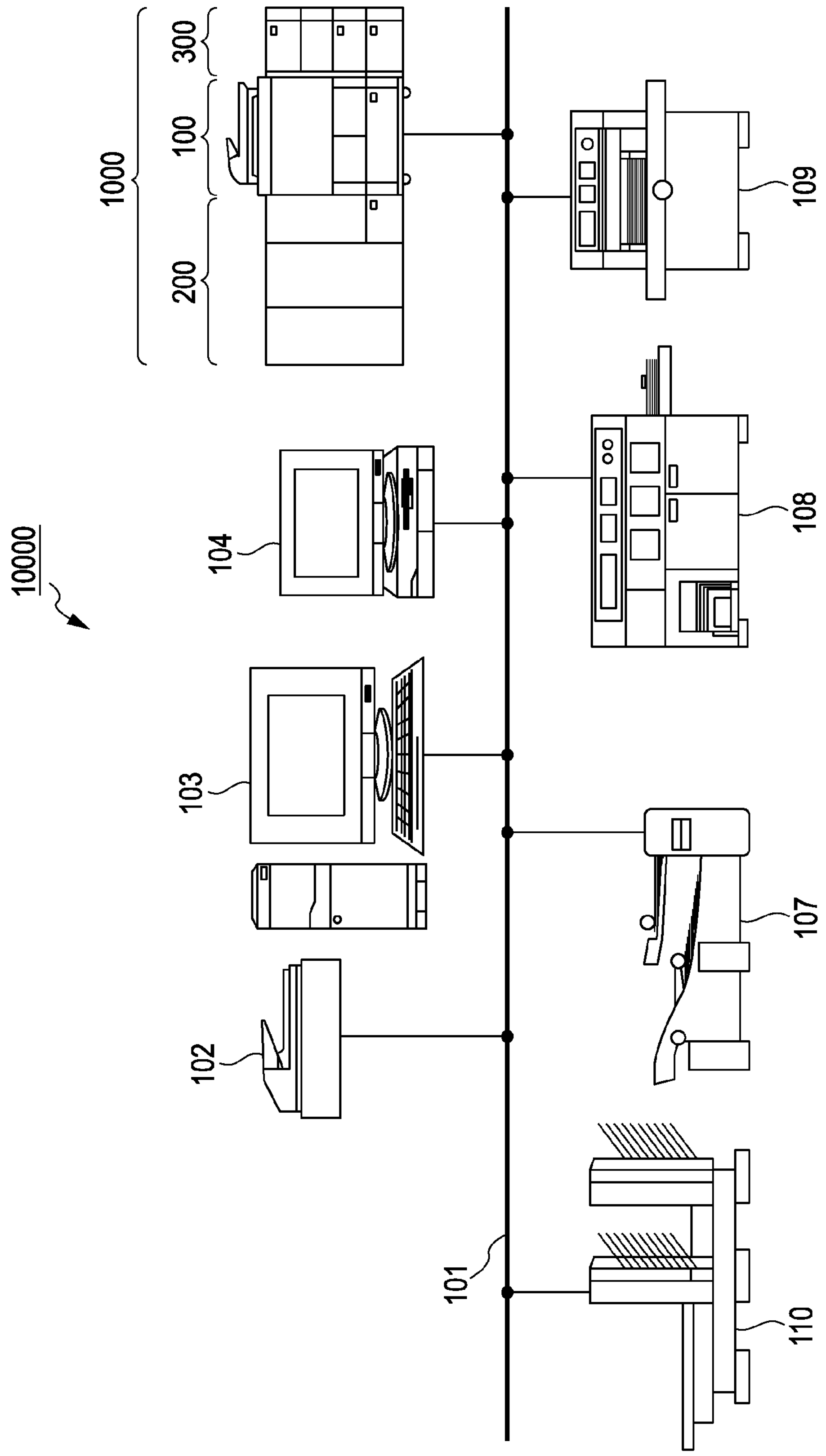
FIG. 1 is a diagram for describing the overall configuration of a POD system, including a printing system to be controlled in an embodiment of the present invention.

The POD system 10000 shown in FIG. 1 includes the printing system 1000, PCs (personal computers) 103 and 104, a sheet folder 107, a trimmer 109, a saddle-stitch binding apparatus 110, a case binding apparatus 108, and a scanner 102.

The printing system 1000 has the printing apparatus 100, a sheet processing apparatus 200, and a sheet feed deck 300.

The printing apparatus 100 prints images read from an image reading unit which the printing apparatus 100 has, and also receives image data sent from the PCs 103 and 104 onto printing sheets. The term "printing sheets" includes a wide variety of types, such as plain copy paper, glossy paper, OHP (overhead projector) plastic sheets, and so forth, and may be referred to simply as "sheets".

The sheet processing apparatus 200 subjects sheets printed at the printing apparatus 100 to sheet processing, such as bookbinding, trimming, and so forth. The sheet processing apparatus 200 is configured such that a conveying path of the sheet processing apparatus 200 can be connected to a conveying path of the printing apparatus 100. Also, the sheet processing apparatus 200 is electrically connected to the printing apparatus 100, so as to be able to receive instructions from the printing apparatus 100. The sheet processing apparatus 200 configured so as to be able to directly receive sheets from the printing apparatus 100, and electrically connected to the printing apparatus 100, is referred to as an "inline finisher".

The sheet feed deck 300 feeds printing sheets to the printing apparatus 100.

The PC 103 is a server computer, which manages jobs to be processed in the POD system 10000 by exchanging data with other apparatuses via a network 101. The PC 104 is a client computer which receives instructions from a user and generates image data. Also, information processing apparatuses, of which external apparatuses such as the PCs 103 and 104 are exemplary, transmit printing execution requests and printing data to the printing apparatus 100 via the network 101, so as to be printed.

The sheet folding apparatus 107 executes folding processing of sheets printed at the printing apparatus 100. The case binding apparatus 108 executes case binding processing of sheets printed at the printing apparatus 100. The trimmer 109 executes trimming processing of sheets, in increments of sheet bundles made up of a predetermined number of sheets.

The sheet folding apparatus 107, case binding apparatus 108, and trimmer 109 can receive instructions from the printing apparatus 100 via the network 101, but cannot directly receive sheets conveyed from the printing apparatus. In order to execute the various types of sheet processing at these sheet processing apparatuses, the operator removes the printed articles printed by the printing apparatus 100 from a sheet output unit of the printing apparatus, and sets the printed articles in the sheet processing apparatus of which the sheet processing is to be applied. The operator then instructs execution of sheet processing with the sheet processing apparatus. The sheet processing apparatus which has received the instruction executes the sheet processing in accordance with the instruction. Thus, a sheet processing apparatus which cannot directly receive supply of sheets form the printing apparatus 100 but is electrically connected to the printing apparatus is called a “near-line finisher”.

The saddle-stitch binding apparatus 110 performs saddle-stitch binding processing on sheets printed by the printing apparatus 100. The saddle-stitch binding apparatus 110 is not connected to the network, and can neither receive instructions from the printing apparatus 100 via the network 101 nor directly receive sheets from the printing apparatus 100. In order to execute sheet processing at these a sheet processing apparatus such as the saddle-stitch binding apparatus 110, the operator removes the printed articles printed by the printing apparatus 100 from the sheet output unit of the printing apparatus, and sets the printed articles in the sheet processing apparatus of which the sheet processing is to be applied. The operator then instructs execution of sheet processing with the sheet processing apparatus. The sheet processing apparatus which has received the instruction executes the sheet processing in accordance with the instruction. Thus, a sheet processing apparatus which is neither capable of directly receiving supply of sheets from the printing apparatus 100 nor is electrically connected to the printing apparatus is called an “off-line finisher”.

While an example of a system configuration of the POD system 10000 has been described above, it should be noted that the PC 103 monitors the status of devices and status of jobs by sequential poling via the network 101, using a protocol predetermined with the near-line finishers, and also manages the execution status (progress status) of the multiple jobs which the POD system 10000 is to process. Also, sheet processing apparatuses include, besides the above-described, various types such as dedicated staplers, dedicated punchers, sealers, collators, and so forth.

Also note that while the printing system has been described as being a printing system 1000 including the printing apparatus, 100, sheet processing apparatus 200, and sheet feed deck 300, but the printing system 100 may be configured of the printing apparatus 100 alone, or may be configured of just the printing apparatus and sheet feed deck 300.

Figure 2:
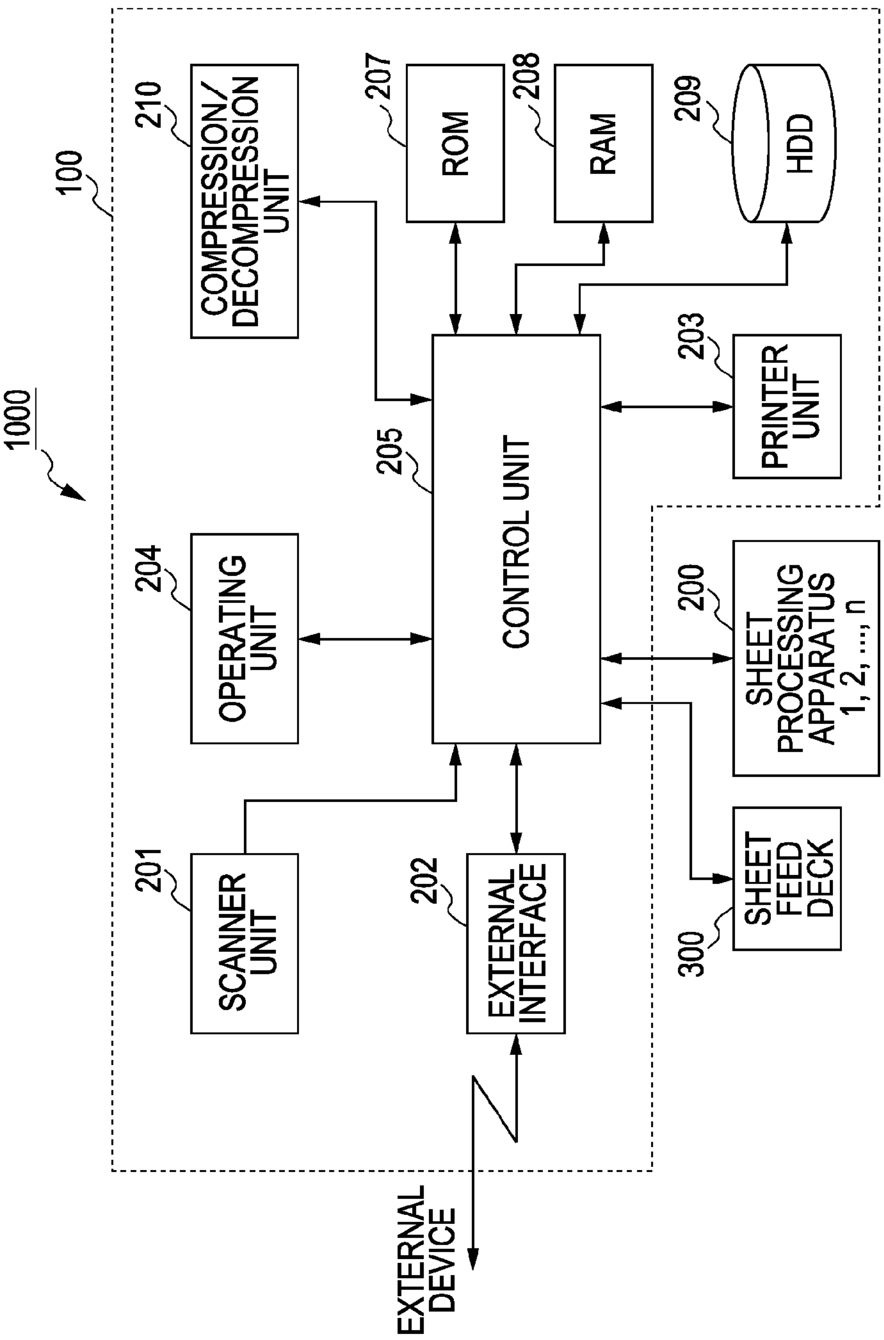
FIG. 2 is a diagram for describing the printing system to be controlled in the embodiment.

Next, the internal configuration of the printing system 1000 which the POD system 10000 has will be described with reference to the system block diagram shown in FIG. 2. Note that with the present embodiment, of the units of the printing system 1000 which are shown in FIG. 2, all other units besides the sheet processing device 200 and sheet feed deck 300 are included within the printing apparatus 100.

The scanner unit 201 has a configuration for reading documents and converting into image data, based on instructions from a control unit 205.

An external interface 202 performs interface control for communication with an external apparatus connected via the network 101, such as the PC 103 or PC 104. The printing apparatus accepts printing requests and image data from the external apparatuses via the external interface 202 as jobs, and transmits image data stored in an HDD 309 to an external apparatus via the external interface 202.

A printer unit 203 records image data onto sheets fed from a sheet feed which the printing apparatus 100 has or the sheet feed deck 300, based on instructions from the control unit 205. The sheet feed unit is an example of an accommodation unit for feeding printing media such as printing sheets or the like.

An operating unit 204 has a key input unit for accepting user operations by hardware keys, and a touch panel which displays software keys (display keys) and accepts user operations from the software keys.

The control unit 205 centrally controls the processing, operations, and so forth, of the various types of units which the printing system 1000 has, such as printing control of the printer unit 203, operation control of the operating unit 204, and so forth.

ROM 207 is read-only memory, and stored therein are various types of control programs used in the present embodiment, including programs for executing the processing of later-described flowcharts, and so forth. The ROM 207 also stores a program for displaying a display screen on the operating unit 204, and a program for interpreting PDL (page description language) received from an external apparatus and rendering this as bitmap image data. The control unit 205 executes the various operations described in the present embodiment by reading out programs from the ROM 207 and executing these.

RAM 208 is readable and writable memory, and functions as work area of the control unit 205.

The HDD 209 stores data to be used in processing by the control unit 205. For example, the control unit 205 stores image data that has been compressed by a compression/decompression unit 210 in the HDD 209. The control unit 205 can save in the HDD 209 image data of jobs to be processed, and multiple sets of data, such as various storage units for storing variables to be used in the control. The control unit 205 effects control such that data of jobs to be processed which have been input various types of input units, such as the scanner unit 201 and the external interface 202 and so forth, can be printed at the printer unit 203, via the HDD 209. Also, the control unit 205 effects control such that data of jobs to be processed can be transmitted to external apparatuses via the external interface 202. Thus, the control unit 205 can perform various types of output processing regarding data of jobs to be processed that are stored in the HDD 209.

The compression/decompression unit 210 performs compression/decompression of image data stored in the RAM 208 or HDD 209 by various types of compression formats, such as JBIG, JPEG, and so forth.

The sheet processing apparatus 200 is detachably attached to the printing apparatus 100, and further, multiple sheet processing apparatuses 200 can be linked to the printing apparatus 100. In such a case, the sheet processing apparatuses 200 will be described with reference numerals 200*a*, 200*b*, 200*c*, and so on, in closer order to the printing apparatus. Also, multiple sheet processing apparatuses 200*a*, 200*b*, 200*c*, and so on, may be collectively referred to as "sheet processing apparatus 200".

The sheet feed deck 300 is detachably attached to the printing apparatus 100, and further, multiple sheet feed decks 300 can be linked to the printing apparatus 100.

Figure 3:
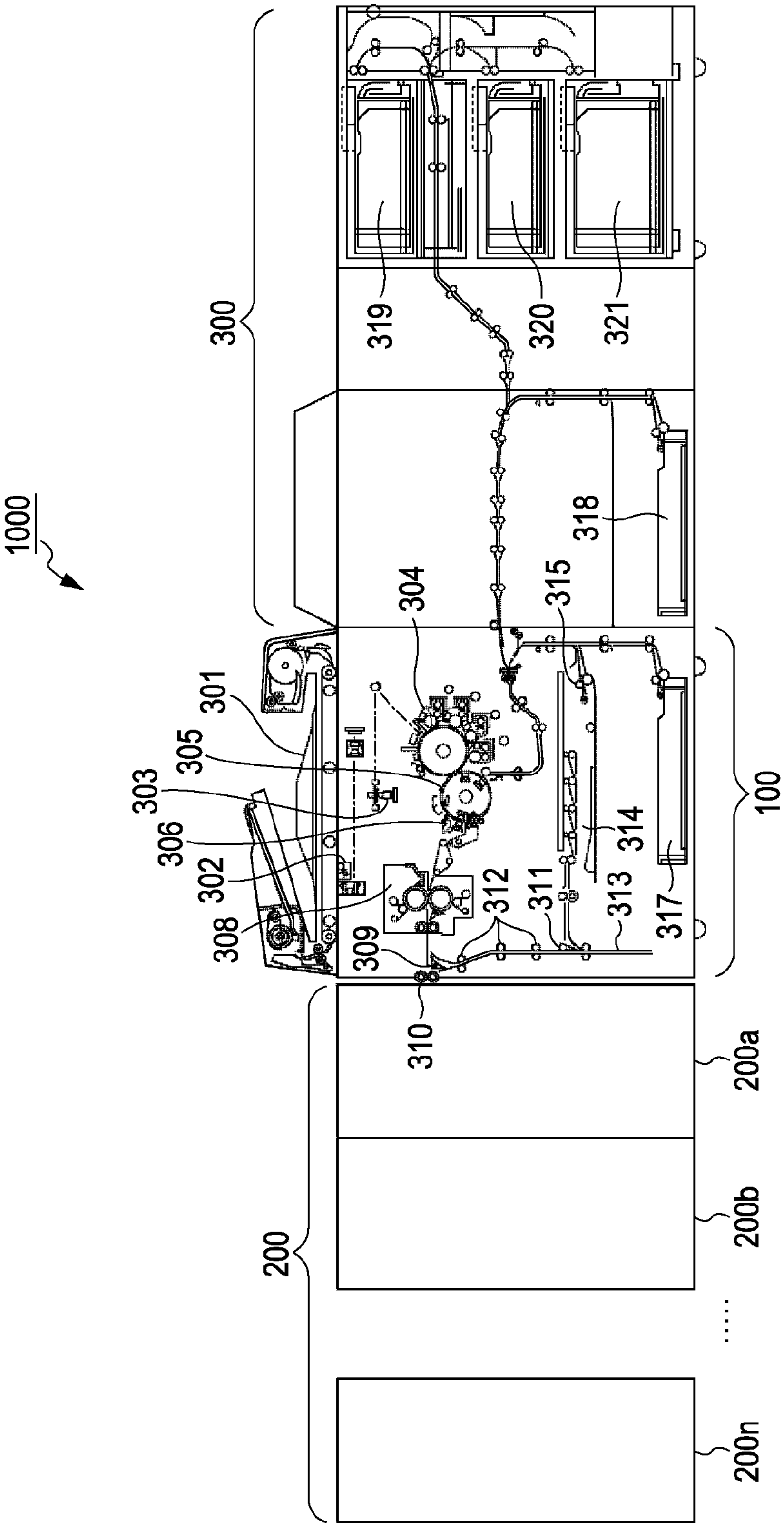
FIG. 3 is a diagram for describing the printing system to be controlled in the embodiment.

Next, the configuration of the printing system 1000 will be described with the apparatus configuration explanatory diagram in FIG. 3 as an example. The printing system 1000 includes the printing apparatus 100, sheet processing apparatus 200, and sheet feed deck 300, with sheets fed from the sheet feed deck 300 being printed at the printing apparatus 100, and the printed sheets being conveyed to the sheet processing apparatus 200.

A paper handling operation, wherein a sheet is fed from a sheet feed unit usable by the printing apparatus 100 and fed into the sheet processing apparatus 200 via the inside of the printer unit 203, will be described with reference to FIG. 3.

Upon the user giving a copy job execution instruction from the operating unit 204 for example, an automatic document feeder (ADF) 301 separates sheets off of the document bundle set in a document tray, one at a time, from the first page, and conveys these to a document plate glass. A scanner 302 reads the image of the document conveyed to the document plate glass, and converts this into image data by a CCD. A beam such as a laser beam or the like for example, which has been modulated in accordance with the image data, is input to a rotatable polygon mirror 303, and irradiated onto a photosensitive drum 304 as reflected scanning light, via a reflecting mirror.

Also, in parallel with the reading processing of the document, the printing apparatus 100 selects a sheet feed unit from which to feed sheets, based on the setting received from the user, and feeds sheets to be used for printing from the selected sheet feed cassette. In this example, sheet feed units 317 through 321 are candidates for selection. A sheet that has been fed passes through a conveyance path, and adheres to a transfer drum 305.

A latent image formed on the photosensitive drum 304 by the laser beam is developed by toner, and the toner image is transferred to the sheet adhered to the transfer drum 305. This sequence of image-formation processing is sequentially executed in the order of yellow (Y), magenta (M), cyan (C), and black (K), thereby forming a full-color image. After the fourth image formation process, the sheet material on the transfer drum 305 is separated therefrom by a separation pawl 306, and conveyed to a fixing device 308 by a pre-fixing conveying unit.

The fixing device 308 is configured of a combination of rollers and belts, has a heat source such as a halogen heater or the like built in, and fuses and fixes the toner on the sheet material onto which the other image has been transferred, by heat and pressure. A sheet output flapper 309 is configured so as to swing on a swinging shaft, thereby governing the direction of conveyance of the sheet material. In the event that the sheet output flapper 309 has swung in the clockwise direction in the drawing, the sheet material is conveyed out straight, and output from the apparatus by an output roller 310. On the other hand, in the event of forming an image on both faces of the sheet member, the sheet output flapper 309 is swung in the counterclockwise direction in the drawing, and the sheet material is changed in direction downwards so as to be sent to a duplex conveying unit. The duplex conveying unit has a reversing flapper 311, reversing roller 312, reversing guide 313, and duplex tray 314.

The reversing flapper 311 is configured so as to swing on a swinging shaft, thereby governing the direction of conveyance of the sheet material. In the event of processing a duplex printing job, the control unit 205 effects control such that the reversing flapper 311 is swung on the counterclockwise direction in the drawing, such that the sheet which has been printed on the first face is sent to the reversing guide 313 via the reversing roller 312. The reversing roller 312 is then temporarily stopped in a state with the trailing edge of the sheet material nipped at the reversing roller 312, with the reversing flapper 311 swung in the clockwise direction in the drawing. Also, the reversing roller 312 is rotated in the reverse direction. Thus, the sheet is conveyed in a switchback manner, and is guided to the duplex tray 314 with the trailing edge and leading edge inverted.

The duplex tray 314 temporarily loads the sheet material, following which the sheet material is sent to a registration roller again by a refeeding roller 315. At this time, the sheet member is conveyed with the face opposite to that in the first transfer process facing the photosensitive drum. An image for the second face is then formed on the second face of the sheet in the same way as with the process described above. Images are thus formed on both faces of the sheet member, and following the fixing process, the sheet is externally output from the printing apparatus main unit by way of the output roller 310. The control unit 205 enables the printing apparatus 100 to perform duplex printing wherein data of a duplex printing job is printed on the first face and second face of a sheet, by executing the above-described duplex printing sequence.

Note that the sheet feed units 317 through 321 are configured such that multiple sheet sizes and multiple sheet types can be set in the sheet feed units so as to be distinguished one from another. The sheet feed units 317 through 312 are each configured having openable sheet feed cassettes, and also have sensors, such as a size detection sensor for detecting the size of sheets set and held in the sheet feed unit, and an open/close detection sensor for detecting whether the sheet feed cassette of a sheet feed unit is open or closed.

For example, the control unit 205 may detect the size of sheets set in a sheet feed unit by the position of guides for aligning the edges of sheets, provided to the sheet feed unit, or may detect the size of sheets set in the sheet feed tray based on information set by the user.

Thus, the control unit 205 processes a job to be printed, using the above-described printing process.

Next, the configuration of the operating unit 204 which the printing system 1000 has will be exemplarily described with reference to FIG. 4. The operating unit 204 has a key input unit 402 for accepting user operations by hardware keys, and a touch panel unit 401 which displays software keys (display keys) and accepts user operations from the software keys.

Figure 4:
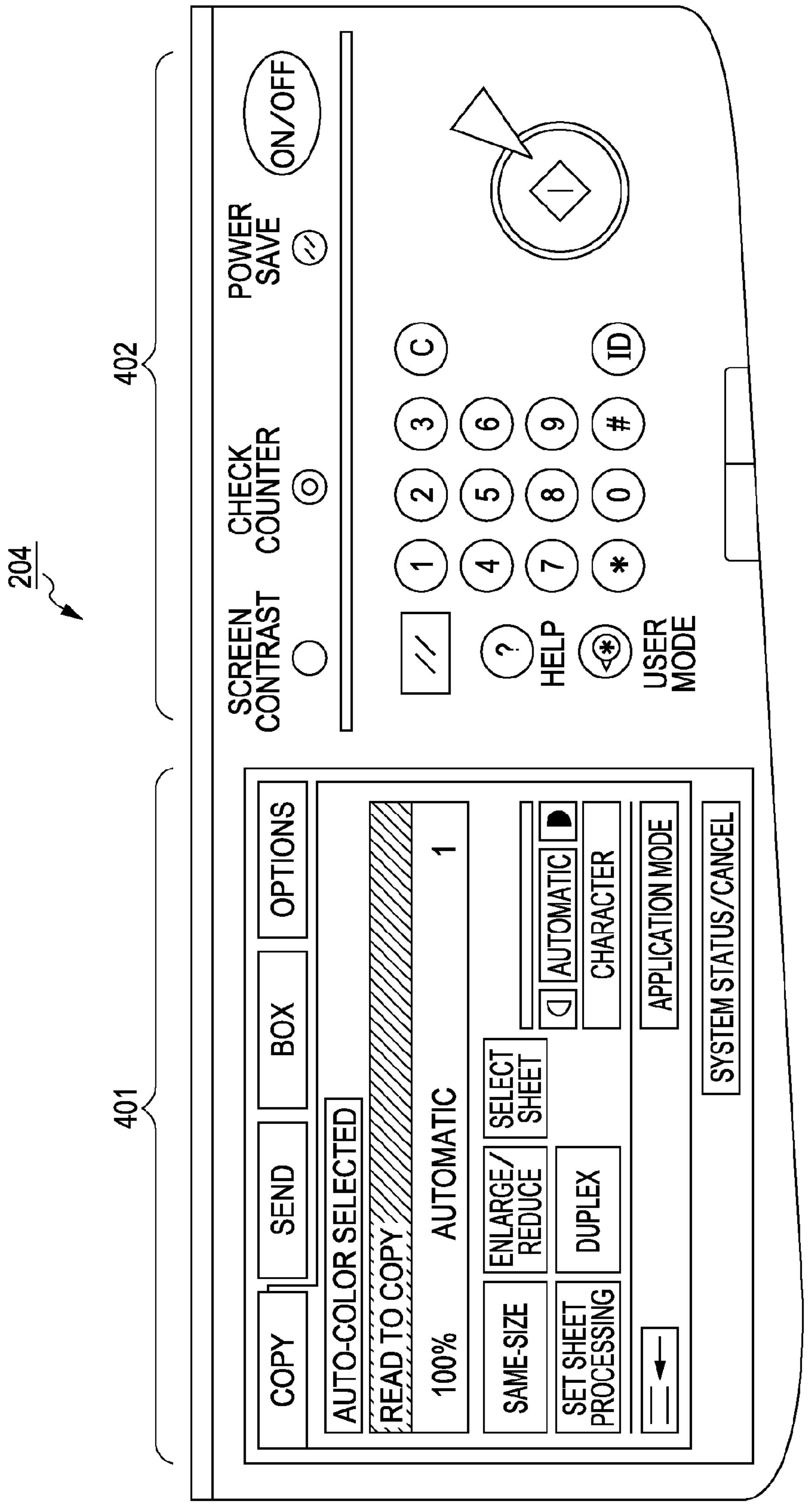
FIG. 4 is a diagram for describing an operating unit to be controlled in the embodiment.

As shown in FIG. 4, the touch panel unit 401 is configured of a touch sensor, with a display screen such as described alter for example, being displayed by the control unit 205. Note that the screen illustrated as being displayed on the touch panel unit 401 in FIG. 4 is a standard screen for copying.

The key input unit 402 has a start key for accepting a printing start request, a numeric keypad for inputting settings for the number of copies, passwords, and so forth, a user mode key for making transition to a system setting screen for each user, and so forth. For example, a user can set the size and type of sheets held in each of the sheet feed units 317 through 312.

Figure 5:
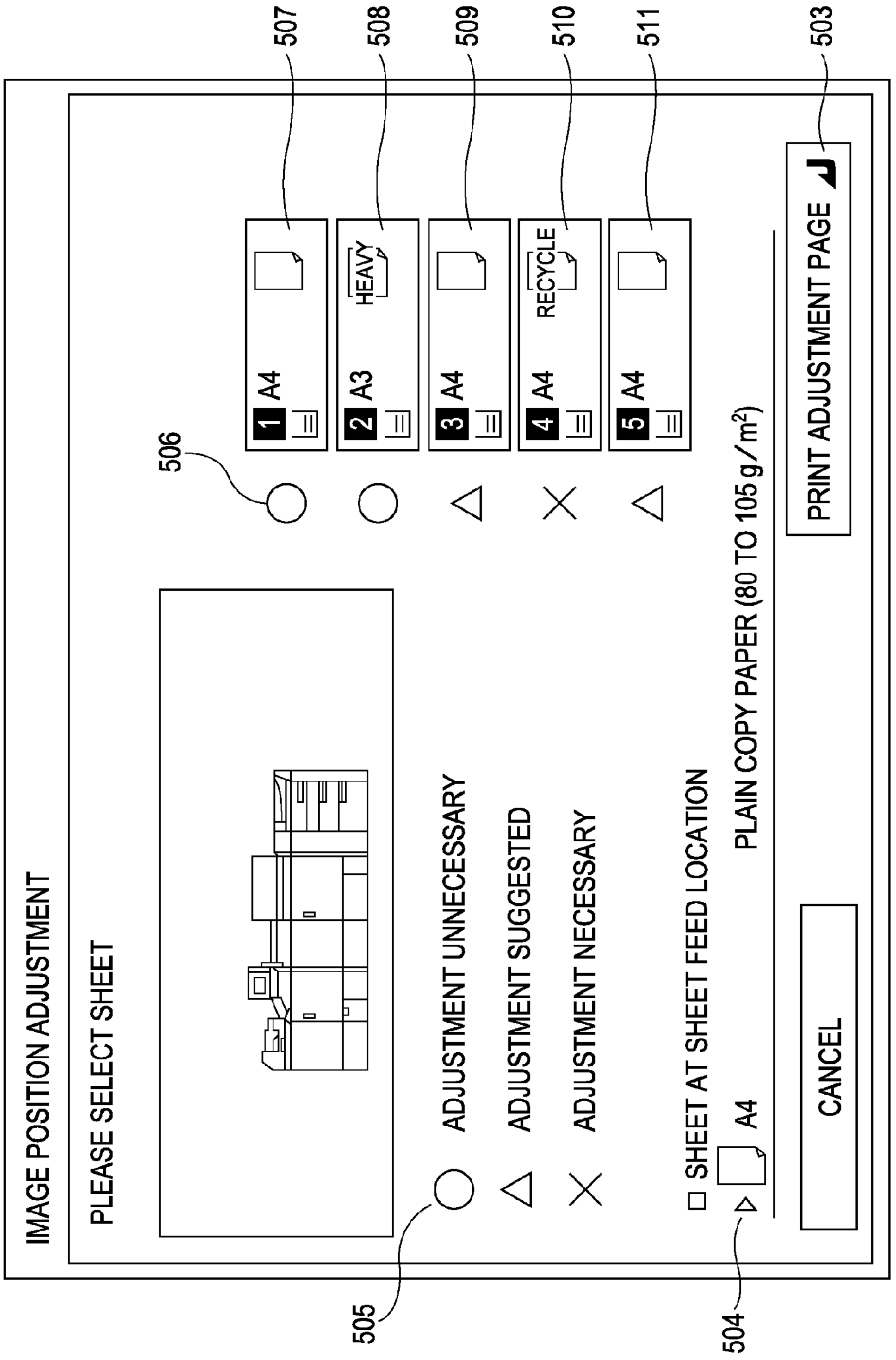
FIG. 5 is a diagram for describing a screen displayed on the operating unit to be controlled in the embodiment.

Now, description will be made regarding an example of a case of a user performing image position adjustment with the printing system 1000 configured as described above. FIG. 5 is an example of an image position adjustment screen displayed on the operating unit 204 by the control unit 205 for performing image position adjustment. This screen is displayed by, for example, pressing an application mode key in the standard screen displayed on the touch panel unit 401 shown in FIG. 4.

In the event that the user presses a "print adjustment page" key 503 with one of the sheet feed units 507 through 511 selected, the control unit 205 prints an image position adjustment page with the printer unit 103. Note that the sheet feed units 507 through 511 correspond to the sheet feed units 317 through 321 in FIG. 3. Also, the screen shown in FIG. 5 is a state wherein the sheet feed unit 509 has been selected. At this time, the control unit 205 displays information relating to the size and type of sheet set in the selected sheet feed unit, in the "sheet at sheet feed location" space 504. The control unit 205 then prints an image position adjustment page using the sheets of the selected sheet feed unit, based on the adjustment values set for the selected sheet feed unit.

Figure 6:
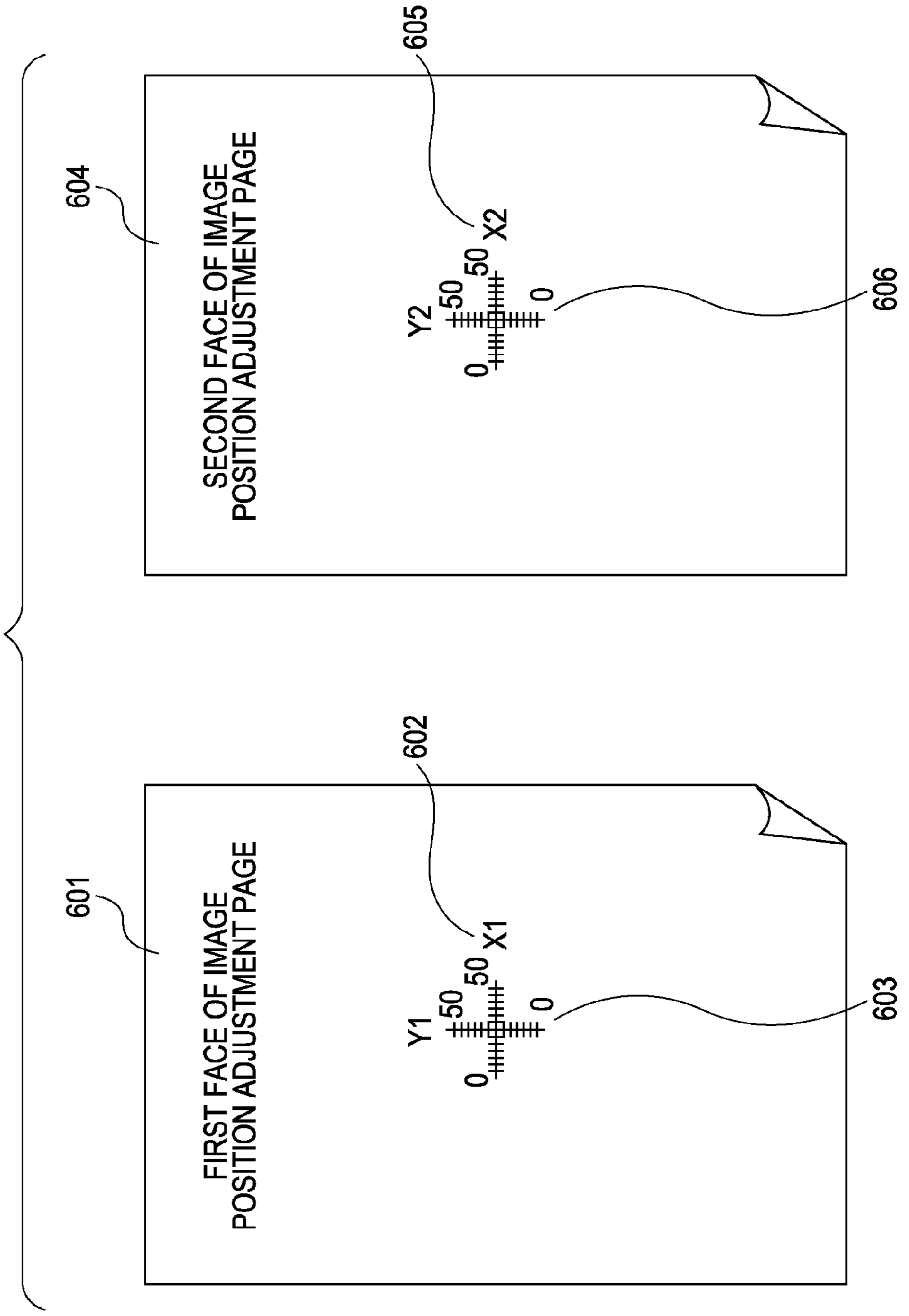
FIG. 6 is a flowchart illustrating image position adjustment operations in the embodiment.

FIG. 6 shows an example of an image position adjustment page. The image position adjustment page is printed on both faces of a single sheet. Reference numeral 601 denotes the front face of the image position adjustment page (first face), and 604 denotes the rear face of the image position adjustment page (second face).

The control unit 205 prints scale marks X1 (602) and scale marks Y1 (603) on the sheet fed from the sheet feed unit, such that the intersection of the scale marks is situated at the center of the image formation region printed by the printer unit 203. In the same way, the control unit 205 prints scale marks X2 (605) and scale marks Y2 (606) on the sheet fed from the sheet feed unit, such that the intersection of the scale marks is situated at the center of the image formation region printed by the printer unit 203.

The user folds in half the sheet upon which the scale marks have been printed, and reads the marks at the fold position. The scale marks X1 (602), Y1 (603), X2 (605), and Y2 (606) are each marked from 0 through 50, is of the printed image is not shifted at all as to the sheet, the scale where the fold comes should read 25.

Figure 7:
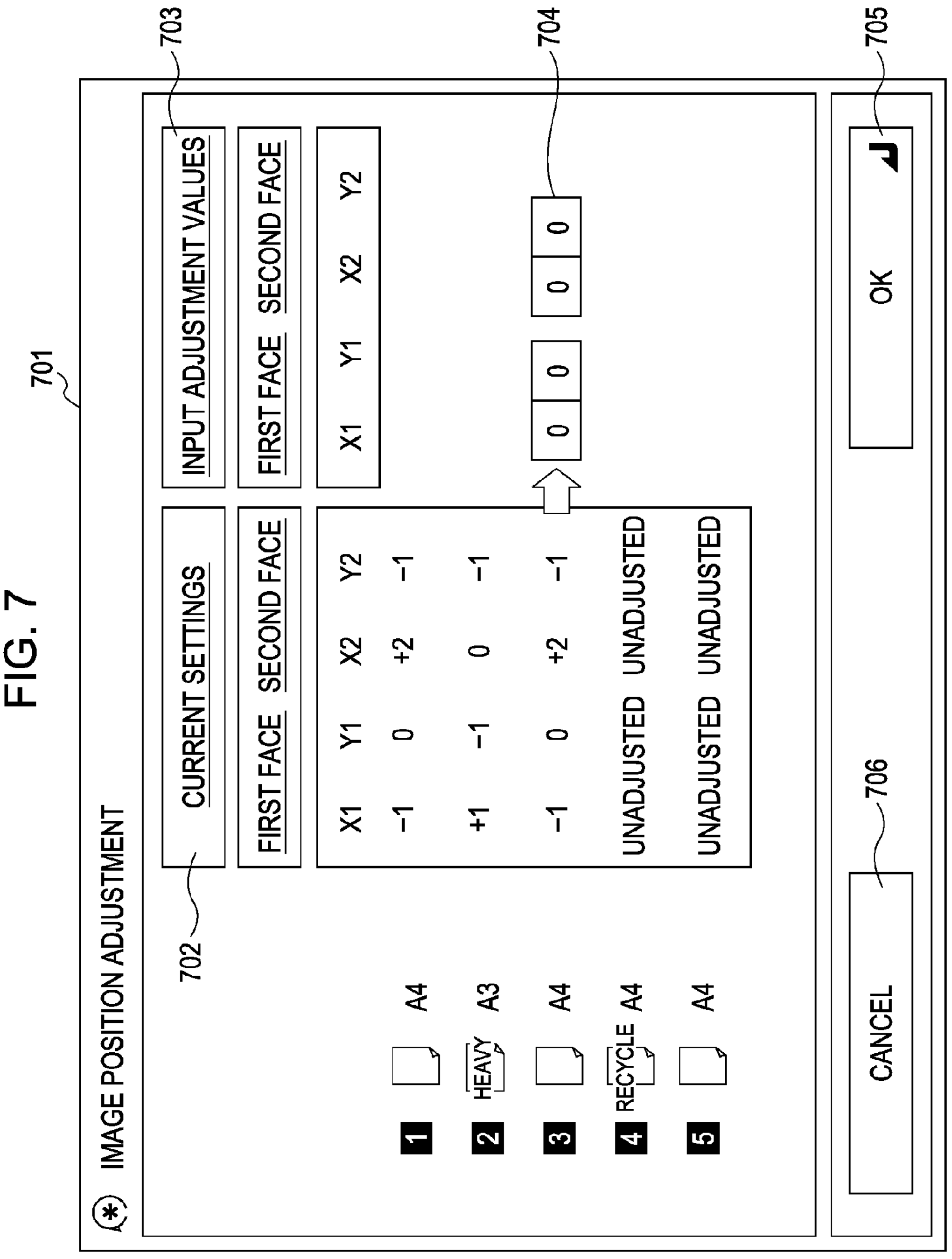
FIG. 7 is a diagram for describing a screen displayed on the operating unit to be controlled in the embodiment.

After printing such an image position adjustment page, the control unit 205 displays an adjustment value input screen for image adjustment such as shown in FIG. 7, on the operating unit 204.

The space for current settings 702 displays the currently-set adjustment values for image position adjustment. In the event that there is need for input of adjustment values, "unadjusted" is displayed. In the case of printing the image position adjustment page in the state of the sheet feeding unit selected in FIG. 5, the control unit 205 displays four adjustment value input boxes 704 in an "input adjustment values" space 703 for the sheet feeding unit corresponding to the sheet feeding unit selected in FIG. 5. The user inputs the value of the scale at the fold when folding the image position adjustment page in half. More specifically, the user folds the first face in half and inputs the X-axis value at the fold in the X1 space in 704, and folds the first face in half and inputs the Y-axis value at the fold in the Y1 space in 704. Further, the user folds the second face in half and inputs the X-axis value at the fold in the X2 space in 704, and folds the second face in half and inputs the Y-axis value at the fold in the Y2 space in 704.

Upon the user pressing an OK button 705, the control unit saves the adjustment values that have been input to the adjustment value input box in a later-described adjustment information table, and closes the dialog box 701.

Upon the user pressing a cancel button 706, the control unit 205 ends the display of this screen without saving the adjustment values input to the adjustment value input box, and returns to display of the standard screen.

Figure 8:
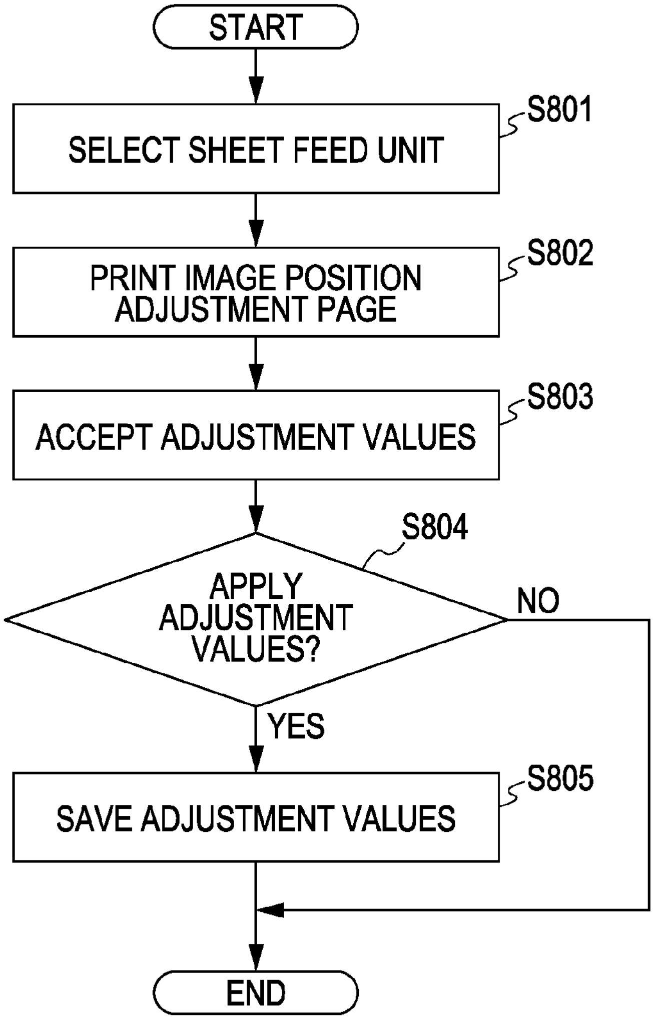
FIG. 8 is a diagram showing an image position adjustment information table in the embodiment.

FIG. 8 is a flowchart illustrating the procedures for processing which the control unit 205 performs for image position adjustment in the above embodiment, starting from the point at which the screen shown in FIG. 5 is displayed on the operating unit 204.

First, in step S801, the control unit 205 selects a sheet feed unit for which image position adjustment is to be performed, based on specification of a sheet feed unit by the user.

In step S802, the control unit 205 prints an image position adjustment, in response to the user having pressed the "print adjustment page" key 503 in the screen shown in FIG. 5.

In step S803, the control unit 205 accepts the adjustment values for image position adjustment input by the user with the screen shown in FIG. 7.

In step S804, the control unit 205 determines whether or not to apply the adjustment values accepted in step S803. For example, in the event that the user has pressed the OK key in the screen in FIG. 7, the processing advances to step S805, and the control unit 205 resisters the adjustment values accepted in step S803 in an adjustment information table, correlated with the sheet feed unit selected in step S801. On the other hand, in the event that the control unit 205 determines that the cancel key 706 has been pressed, determination is made that the adjustment values are not to be applied, and the processing ends.

Next, FIG. 9 shows an example of an adjustment information table saved in the HDD 209. The adjustment information table is a table holding information relating to image position adjustment set for each of the multiple sheet feed units which the printing apparatus 100 has, with the control unit 205 performing image position adjustment based on the values set in the adjustment information table at the time of printing.

The adjustment information table is configured having, for example, three rows for each sheet feed unit, as can be seen in column 903, holding the three newest adjustment values of the adjustment values accepted from the user. The No. 1 row in the column 903 is the newest adjustment values (first adjustment values), the No. 2 row is the second newest adjustment values (second adjustment values), and the No. 3 row is the third newest adjustment values (third adjustment values). For example, looking at the entries for tray 1, the adjustment values which column 903 shows to be No. 1 have been accepted at "11/10/2206, 10:45". The adjustment values which column 903 shows to be No. 2 have been accepted at "11/8/2206, 16:23", and the adjustment values which column 903 shows to be No. 3 have been accepted at "10/23/2206, 11:22". Accordingly, the adjustment values which column 903 shows to be No. 1, which is the smallest number, are the newest, followed in newness by No. 2 and No. 3.

Upon new input of adjustment values being accepted from the user, the control unit 205 discards the contents of row No. 3, copies the information of row No. 2 to row No. 3, copies the information of row No. 1 to row No. 2, and registers the newly-accepted information in row No. 1.

The control unit 205 registers the adjustment values X1, Y1, X2, and Y2, which have been accepted from the user. 0 is recorded if not adjusted.

Column 905 records the size of sheets held in the sheet feed unit at the time that adjustment was performed. If unadjusted, a value "–" is recorded.

Column 906 records the type of sheets held in the sheet feed unit at the time that adjustment was performed. If unadjusted, a value "–" is recorded.

Column 907 records the date-and-time of adjustment. If unadjusted, a value "–" is recorded.

Column 908 records one of the following values as the state following the last adjustment, for each sheet feed unit.

Not Opened: A state wherein the sheet feed unit has not been opened even once following accepting the adjustment values for the sheet feed unit the last time, i.e., a state wherein, following sheets having been set in the sheet feed unit, adjustment values have been received for the sheet feed unit at least one, but the user has not opened the sheet feed unit since.

Opened: A state wherein the sheet feed unit has been opened at least once following accepting the adjustment values for the sheet feed unit the last time, but neither the size nor type of sheets for the sheet feed unit have been changed, i.e., a state wherein the user has opened the sheet feed unit cassette to replenish sheets, and sheets of the same size and type have been set.

Changed: A state wherein either the size or type of sheets have been changed following accepting the adjustment values for the sheet feed unit the last time, i.e., a state wherein the user has opened the sheet feed unit cassette to set sheets of a different size or different type, and sheets of a different size or different type from the sheets which had been set in the sheet feed unit so far are set in the sheet feed unit.

–: An unadjusted state, wherein the sheet feed unit has not been adjusted, i.e., a state wherein no adjustment values have been input since the time of shipping from the factory.

The control unit 205 determines whether or not the user has input adjustment values regarding a sheet feed unit in the state of "–", and in the event that there has been input of adjustment values, the control unit 205 rewrites the state of the sheet feed unit from "–" to "Not Opened". In the event that a sheet feed unit in the state of "Not Opened" has been opened, the control unit 205 rewrites the state thereof from "Not Opened" to "Opened". Also, the control unit 205 determines whether or not the size of type of sheets have been changed for a sheet feed unit in the state of "Opened", and if changed, rewrites the state from "Opened" to "Changed". Further, in the control unit 205 determines whether or not there has been input of adjustment values from the operating unit 204 by the user for the sheet feed unit in the state of "Changed", and if there has been input of adjustment values, rewrites the state of the sheet feed unit from "Changed" to "Not Opened".

In the event of accepting printing instructions from the user and performing printing, the control unit 205 performs image position adjustment based in the first adjustment values (newest adjustment values) of the adjustment information table stored for each sheet feed unit. However, there are cases wherein the size or type of sheets set in the sheet feed unit has been changed following accepting the newest adjustment value. In such cases, there is the need to change the information relating to image position adjustment in accordance with the sheet size or type.

Accordingly, the control unit 205 holds information indicating whether or not image position adjustment is being performed appropriately for each sheet feed unit, in an image position adjustment table shown in FIG. 10, and performs later-described user support control based on this table.

FIG. 10 illustrates an example of an adjustment state table representing the image position adjustment state, This image position adjustment table holds information indicating the state of image position adjustment for each of the multiple sheet feed units, as indicated by column 1002.

Columns 1003 and 1004 hold information relating to the size of sheets, and the type of sheets, held in each sheet feed unit, respectively. The user can set the size and type of sheets for each of the sheet feed units 317 through 321, using the operating unit 204. The control unit 205 accepts settings of sheet size from the operating unit for each sheet feed unit, and records the accepted sheet size in the column 1003. Alternatively, the control unit 205 can detect the size of the sheets by reading the position of guides provided in the sheet feed unit. For example, in the event of the user sliding guides of the sheet feed unit to abut the edge of the sheets set in the sheet feed unit, the control unit 205 reads the positions of the guides and detects the size of sheets set in the sheet feed unit. Also, the control unit 205 accepts sheet type settings for each of the sheet feed unit form the operating unit 204, and records the received sheet types in the column 1004. The control unit 205 detects the sheet types by referencing the values of the adjustment state table.

Column 1005 holds values 1 through 3, as information representing the adjustment status. The numeral 1 is information indicating that the sheet feed unit needs adjustment, 2 is information indicating that adjustment is suggested for the sheet feed unit, and 3 is information indicating that adjustment of the sheet feed unit is unnecessary.

Also, column 1006 holds information relating to which of adjustment values set for the sheet feed unit in the past as shown in FIG. 8 are being reused, for each sheet feed unit. Of the past adjustment values, adjustment values can be reused for sheets of the same size and same type as those currently held. Accordingly, in the event that there is past history information set regarding the same size and type sheets, that information is held in the column 1006 as reuse information.

Reuse information is held in an A-B format, for example. A is a sheet feed unit having reusable history information, with one of the numerals of the sheet feed units 1 through 5 shown in column 902 in FIG. 9 being appropriated thereto. Also, B is a history No. of reusable history information of the history information stored correlated to the sheet feed unit indicated by A, and the past history Nos. 1 through 3 shown in column 903 in FIG. 9 can be appropriated.

For example, "3-2" is held for the reuse information of the sheet feed unit 2 in FIG. 10. This means that at the time of performing image position adjustment of the sheet feed unit 3, the user will reuse, of the history information corresponding to the sheet feed unit 3, the "second newest information". Also, for example, "1-1" is held for the reuse information of the sheet feed unit 1 in FIG. 10. This means that at the time of performing image position adjustment of the sheet feed unit 1, the user will reuse, of the history information corresponding to the sheet feed unit 5, the "newest information". Note that in the event that A-B is 0-0, this means that there is no need to reuse adjustment values for the sheet feed unit, or that there are no reusable adjustment values.

Figure 11:
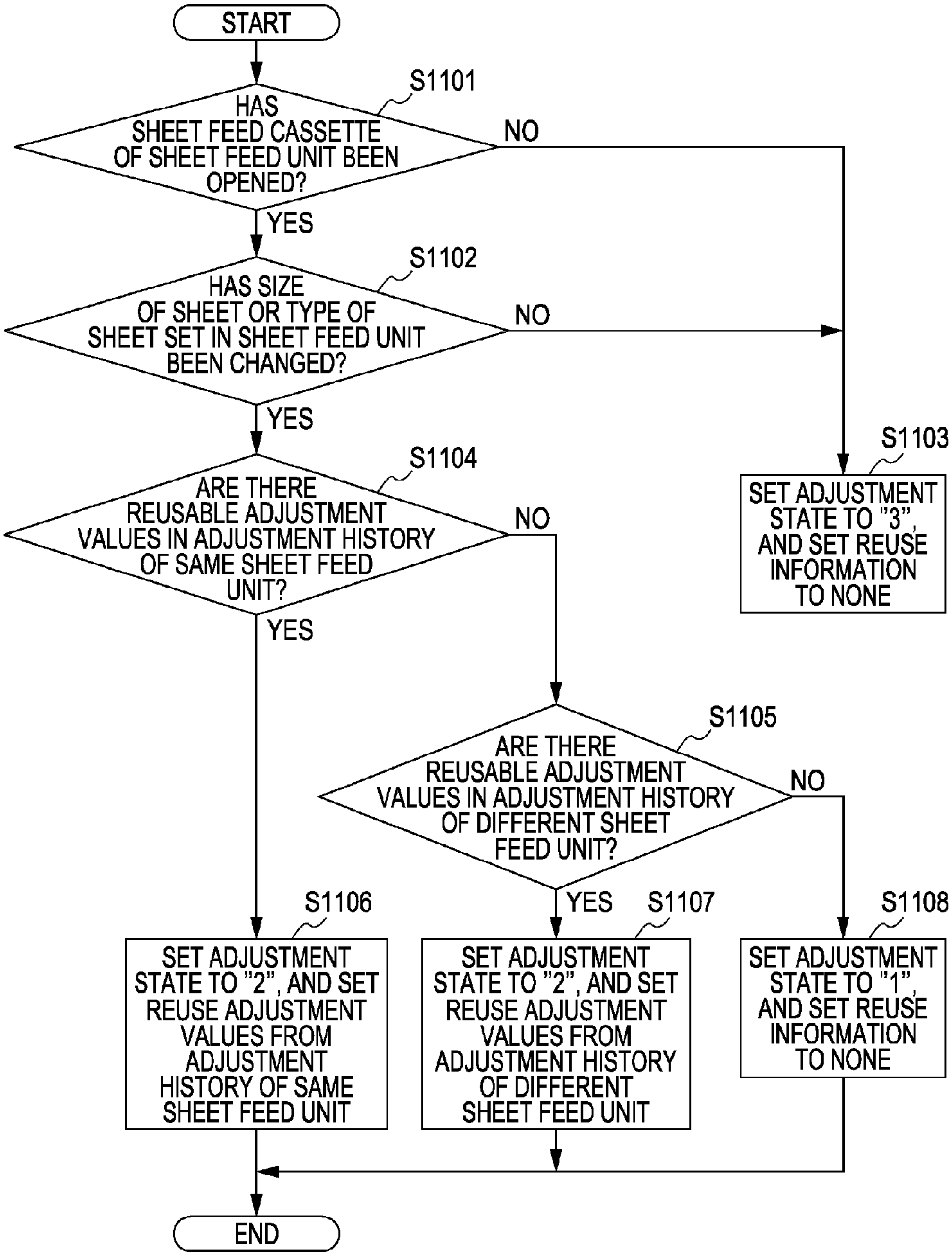
FIG. 11 is a diagram for describing a screen displayed on the operating unit to be controlled in the embodiment.

Information representing the adjustment state for each sheet feed unit, and reuse information, are calculated for each sheet feed unit by performing the control shown in the flowchart in FIG. 11 for each sheet feed unit. The flowchart shown in FIG. 11 starts from the point of accepting adjustment values for a certain sheet feed unit from the user.

In step S1101, the control unit 205 determines whether or not the sheet feed cassette of the sheet feed unit has been opened. For example, the control unit determines whether or not the "state following last adjustment" value in column 908 in the image position adjustment information table in FIG. 9 is "Not Opened". If "Not Opened" this means that the sheet feed unit has not been opened since accepting the adjustment values the last time, and that the size and type of sheets held in the sheet feed unit have not been changed. In this case, image position adjustment is unnecessary, so the flow proceeds to step S1103, the adjustment state is set to "3 (adjustment unnecessary)", and since there is no need to reuse adjustment values, column 1006 in FIG. 10 is set to "0-0".

If the sheet feed cassette of the sheet feed unit has been opened, the flow proceeds to step S1102, and the control unit 205 determines whether or not the size or type of sheets held in the sheet feed unit have been changed. As described above, in the event that the sheet feed cassette of the sheet feed unit has been opened but the size and type of the sheets set in the sheet feed unit have not been changed, the control unit 205 sets the "state following last adjustment" value in column 908 to "Opened". In the event that the sheet feed unit has been opened but the size and type of the sheets set in the sheet feed unit have not been changed, image position adjustment is unnecessary. Accordingly, if the state is "Opened", the processing of step S1103 is performed, wherein the adjustment state is set to "3 (adjustment unnecessary)", and since there is no need to reuse adjustment values, column 1006 in FIG. 10 is set to "0-0".

On the other hand, in the event that the size or type of the sheets held in the sheet feed unit have been changed, i.e., in the event that the value in column 908 is not "Opened", the flow advances to step S1104.

In step S1104, the control unit 205 determines whether or not there is reusable history information in the adjustment history of the same sheet feed unit. In the event that the value of the "state following last adjustment" value in column 908 is "–" (unadjusted), this means that the sheet feed unit has never been adjusted, so the control unit 205 determines that there is no reusable information for the same sheet feed unit, and advances the flow to step S1105.

On the other hand, in the event that there is information in the history information for the same sheet feed unit regarding sheets of the same size and type as the sheets set in the sheet feed unit (reusable information), the control unit 205 advances the flow to step S1106.

In step S1106, the control unit 205 sets the adjustment state to "2", and reuses and sets the reusable adjustment values. Also, the control unit 205 appropriates numerals representing the information being reused to the symbols A and B for the "A-B" in the column 1006 in the adjustment state table. In the event that there are multiple reusable adjustment values within the history information for the same sheet feed unit, the adjustment values with the newest date-and-time of adjustment are reused from the multiple adjustment values. Alternatively, in the event that there are multiple reusable adjustment values, the control unit 205 may display the multiple reusable adjustment values on the operating unit 204, for the user to select. In this case, the control unit 205 appropriates numerals representing the information selected by the user to the symbols A and B for the "A-B" in the column 1006 in the adjustment state table, and records the values.

In step S1105, the control unit 205 determines whether or not there is adjustment history which can be reused for adjustment history for another sheet feed unit.

The control unit 205 searches the adjustment history for other sheet feed units, and in the event that there is information of sheets of the same size and type as the sheets set in the sheet feed unit (i.e., reusable information), the flow advances to step S1107.

In step S1107, the control unit 205 sets the adjustment state to "2", and reuses and sets the reusable adjustment values. Also, the control unit 205 appropriates numerals representing this information to the symbols A and B for the "A-B" in the column 1006 in the adjustment state table. In the event that there are multiple reusable adjustment values within the history information for other sheet feed units, the adjustment values with the newest date-and-time of adjustment are reused from the multiple adjustment values. Alternatively, in the event that there are multiple reusable adjustment values for other sheet feed units, the control unit 205 may display the multiple reusable adjustment values on the operating unit 204, for the user to select. In this case, the control unit 205 appropriates numerals representing the information selected by the user to the symbols A and B for the "A-B" in the column 1006 in the adjustment state table, and records the values.

On the other hand, in the event that the control unit 205 determines ion step S1105 that there is no reusable information, the flow proceeds to step S1108.

In step S1108, the control unit 205 sets the adjustment state to "1", and since there are not reusable adjustment values, column 1006 in FIG. 10 is set to "0-0" (no reuse information).

Figure 12:
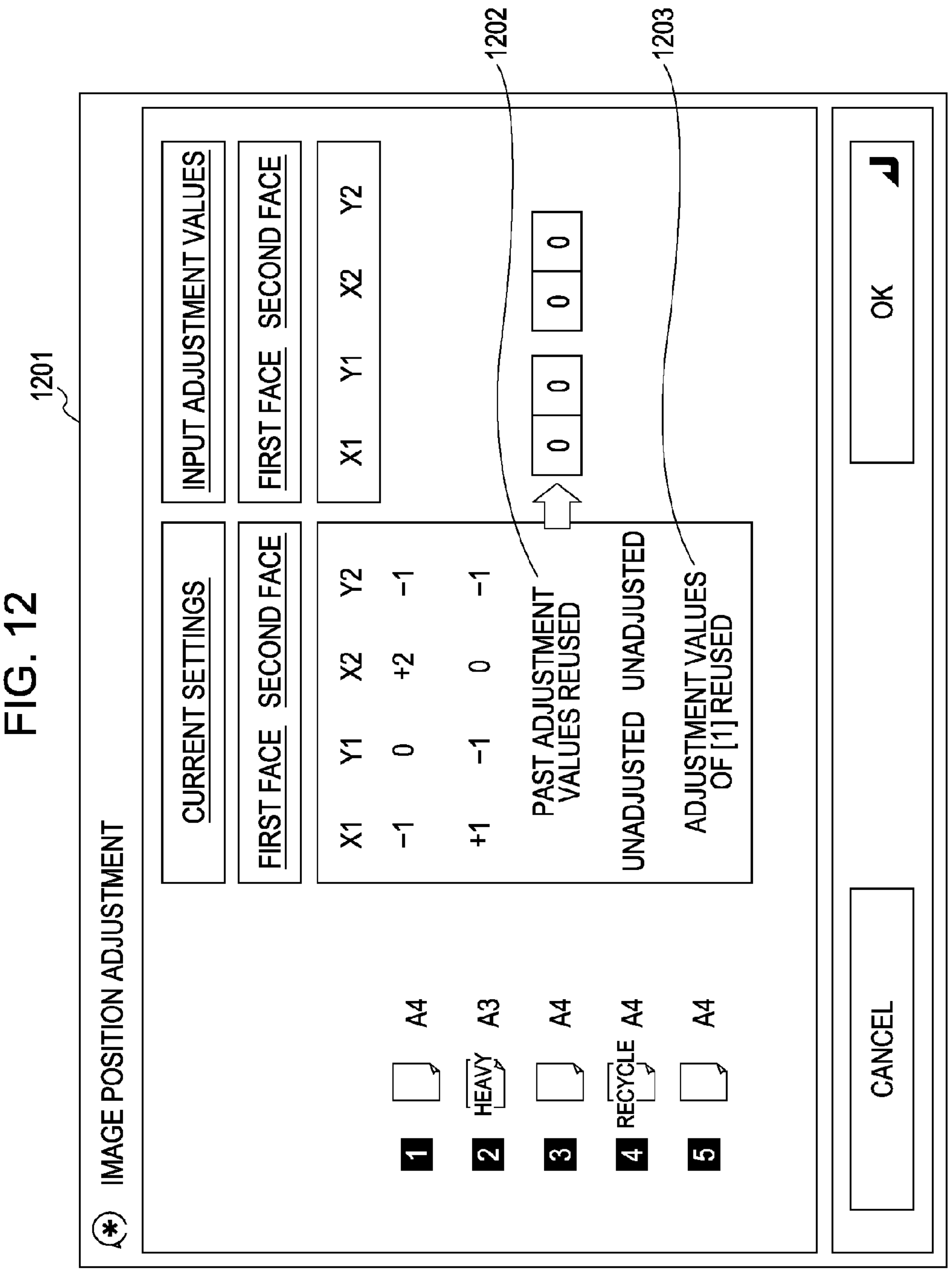
FIG. 12 is a diagram for describing a screen displayed on the operating unit to be controlled in the embodiment.

Thus, the control unit 205 uses this control to manage the adjustment state and reuse state for each sheet feed unit. Accordingly, even in the event that the size or type of sheets in a sheet feed unit have been changed, if there is history information in past image position adjustment history which can be reused, the control unit 205 can reuse this to perform image position adjustment and printing. Also, the control unit 205 references the information in the image position adjustment state table shown in FIG. 10, and in the event that adjustment history of past adjustment is being reused, displays an image position adjustment screen such as shown in FIG. 12. In the event that a sheet feed unit is reusing past adjustment values of that sheet feed unit, display is made as indicated by 1202, and in the event that a sheet feed unit is reusing adjustment values of another sheet feed unit, display is made as indicated by 1203. Alternatively, even in the case that adjustment values are being reused as indicated by 1202, the user can re-input adjustment values after printing an image position adjustment page. In this case, the control unit records the adjustment values newly input by the user, and performs printing based on the newly-input adjustment values.

Also, the control unit 205 performs a display relating to whether or not there is the need for image position adjustment for each sheet feed unit, as indicated by reference numeral 506 in FIG. 5. Reference numeral 505 in FIG. 5 is a description relating to the display, telling that a circle implies that no adjustment is necessary, a triangle implies that adjustment is suggested, and an X implies that adjustment is necessary. For example, the control unit 205 displays a circle corresponding to a display portion corresponding to a sheet feed unit of which the table in the adjustment state table is "3". Also, the control unit 205 displays a triangle corresponding to a display portion corresponding to a sheet feed unit of which the table in the adjustment state table is "2", and displays an X corresponding to a display portion corresponding to a sheet feed unit of which the table in the adjustment state table is "1". Thus, the control unit 205 can notify the user whether or not adjustment is necessary for each sheet feed unit which the printing system has. Accordingly, the user can easily tell which sheet feed unit of the multiple sheet feed units needs to be set at the time of performing image position adjustment, thereby alleviating the load on managing image position adjustment.

Also, the control unit can perform control such as described below, based on information held in tables such as described above.

The user can select an automatic sheet feed unit selection mode which performs "automatic sheet feed unit selection", wherein the control unit 205 automatically selects one of the multiple sheet feed units which the printing system 1000 has. Upon receiving a printing instruction in the state of the user having selected the "automatic sheet feed unit selection" mode, first, in the case of copying, the control unit 205 determines the size of the image data read by the scanner unit 201. Also, in a case of printing image data accepted via the external interface 202, the printing sheet size specified at the Pc 103 or PC 104 is determined from added information of the image data. The control unit 205 then automatically selects, from the multiple sheet feed units (sheet feed units 1 through 5 in the case of the present embodiment) which the printing system has, the sheet feed unit in which sheets of the determined size are set. The control unit 205 then executes printing using the sheets set in the selected sheet feed unit.

Also, the user can set the printing system 1000 to an automatic sheet feed unit switchover mode which performs "automatic sheet feed unit switchover". In the automatic sheet feed unit switchover mode, in the event that a sheet feed unit from which sheets are being fed runs out of sheets while executing printing, another sheet feed unit in which sheets of the same size and type have been set is automatically set, based on the information of the sheet feed unit.

In the event of performing such "automatic sheet feed unit selection" or "automatic sheet feed unit switchover" as well, the control unit 205 can perform the control described below to maintain a precise image printing position, by using information of the above-described tables.

Here, an example of executing a copy job will be described. The user can select conditions for sheets to be used for printing (sheet size and/or sheet type), from a menu which is displayed by pressing the sheet selection button in the standard screen shown in FIG. 4 at the time of performing copying. Upon receiving a copy execution instruction in the state in which the user has selected the conditions for sheets, the control unit 205 sets a sheet feed unit which satisfies the sheet conditions as the sheet feed unit from which sheets are to be fed. The control unit 205 then performs the image position adjustment based on the adjustment values to this sheet feed unit from which sheets are to be fed, and prints the image data read by the scanner unit 201 onto sheets fed from this sheet feed unit.

The user can select "automatic" as a sheet condition, form the menu displayed by pressing the sheet selection button in the standard screen shown in FIG. 4. Upon receiving a printing instruction in the state in which "automatic" has been selected, the control unit 205 performs the above-described "automatic sheet feed unit selection", and executes printing according to the printing instruction using the sheets of the automatically-selected sheet feed unit, as a copy job.

First, the control unit 205 determines the size of the image data read by the scanner unit 201. A sheet feed unit in which sheets of the size determined is taken as a candidate of the sheet feed unit from which sheets are to be fed. For example, in the event that the image data that has been read is of an A4 size, the control unit 205 takes a sheet feed unit in which A4 size sheets have been set as a candidate for the sheet feed unit from which sheets are to be fed. In the event that there is no sheet feed unit in which sheets of the size that has been read are set within the printing system 1000, the control unit 205 displays an error message on the operating unit 204 prompting replenishing sheets of the size that has been read.

Figure 16:
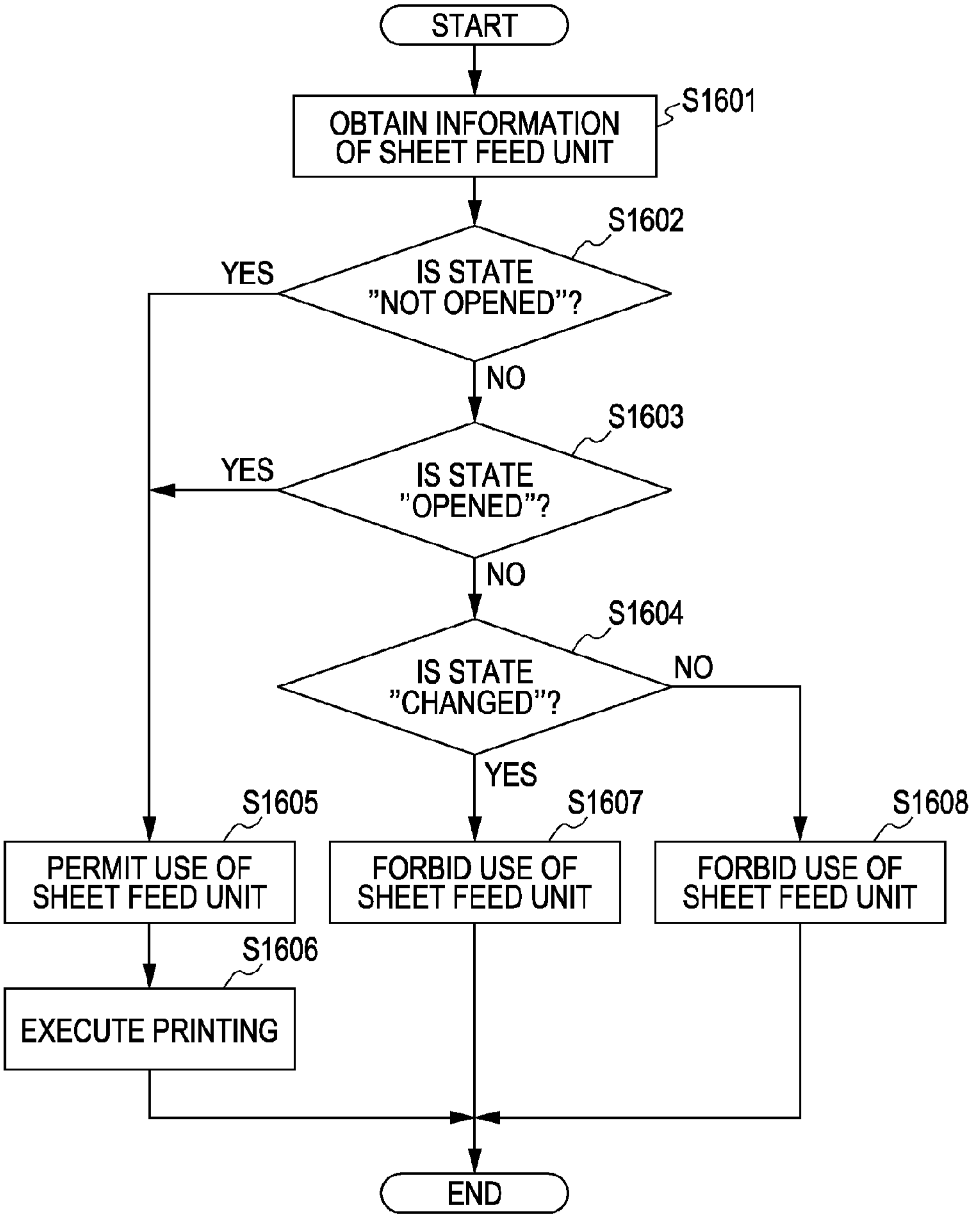
FIG. 16 is a flowchart for describing an example of control procedures according to the embodiment.
Figure 17:
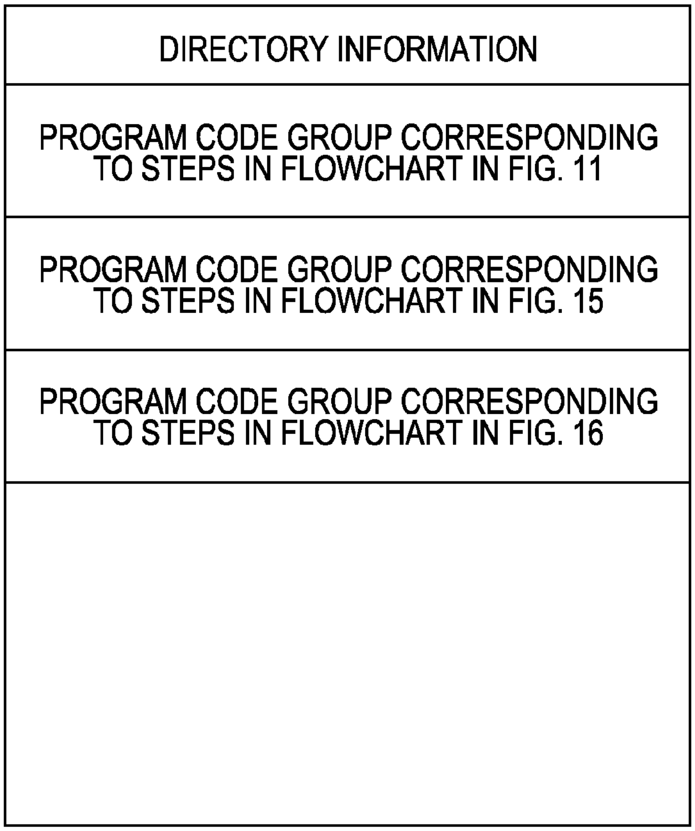
FIG. 17 is a diagram for describing a program code group according to the embodiment.

The control unit 205 executes the processing of the flowchart shown in FIG. 16 with regard to the sheet feed unit which has been set as the candidate for the sheet feed unit from which sheets are to be fed, with the above-described method. A case can be conceived wherein there would be multiple candidates, in which case the processing of the flowchart shown in FIG. 16 is executed in order from the sheet feed unit candidate of which the sheet feed unit No. is smallest.

First, in step S1601, the control unit 205 obtains information regarding a sheet feed unit which is taken as a candidate for the sheet feed unit from which sheets are to be fed.

In steps S1602 through S1604, the control unit makes reference to the adjustment information table shown in FIG. 9, and determines the state following the last adjustment of the sheet feed unit. In step S1602, the control unit 205 determines whether or not the state following the last adjustment of this sheet feed unit is "Not Opened". In the event that the state is determined to be "Not Opened", the flow proceeds to step S1605, and the control unit 205 permits usage of the sheet feed unit taken as the sheet feed unit from which sheets are to be fed, and in step S1605 executes printing using the sheets set in the sheet feed unit.

On the other hand, in the event that the state following the last adjustment of this sheet feed unit is determined in step S1602 to be "Not Opened", the flow proceeds to step S1603.

In step S1603, the control unit 205 determines whether or not the state following the last adjustment of this sheet feed unit is "Opened". In the event that the state is determined to be "Opened", the flow proceeds to step S1605, and processing the same as with the above-described steps S1605 and S1606 is performed. As described above, an "Opened" state indicates that the sheet feed unit has been opened, but neither the size nor the type of the sheets in the sheet feed unit have been changed, so suitable image position adjustment will be performed by printing with the currently-set adjustment values.

On the other hand, in the event that the control unit 205 determines that the state following the last adjustment of this sheet feed unit is not "Opened", the flow proceeds to step S1604.

In step S1604, the control unit 205 determines whether or not the state following the last adjustment of this sheet feed unit is "Changed". In the event that the state is determined to be "Changed", the flow proceeds to step S1607, where use as the sheet feed unit from which sheets are to be fed is forbidden. Note that an arrangement may be made wherein the control unit 205 makes a display on the operating unit 204 to the effect that the sheet feed unit for which the state following the last adjustment has been determined to be "Changed" in step S1604 needs input of adjustment values.

On the other hand, in the event that the control unit 205 determines in step S1604 that the state following the last adjustment of this sheet feed unit is not "Changed" either (i.e., is "–"), the flow proceeds to step S1608, where use as the sheet feed unit from which sheets are to be fed is forbidden. Note that an arrangement may be made wherein the control unit 205 makes a display on the operating unit 204 to the effect that the sheet feed unit for which the state following the last adjustment has been determined not to be "Changed" either in step S1604 has never had input of adjustment values.

In the event that usage of the sheet feed unit has been forbidden in step S1607 or step S1608, the control unit 205 determines whether or not there is another candidate sheet feed unit for the sheet feed unit from which sheets are to be fed. For example, in the event that the size of the image data that has been read is A4 size, the control unit 205 determines whether or not there is a another sheet feed unit in which sheets of the A4 size are set. In the event that such a sheet feed unit exists, this sheet feed unit is taken as a candidate, and the processing of the flowchart shown in FIG. 16 is executed on that sheet feed unit.

Figure 14:
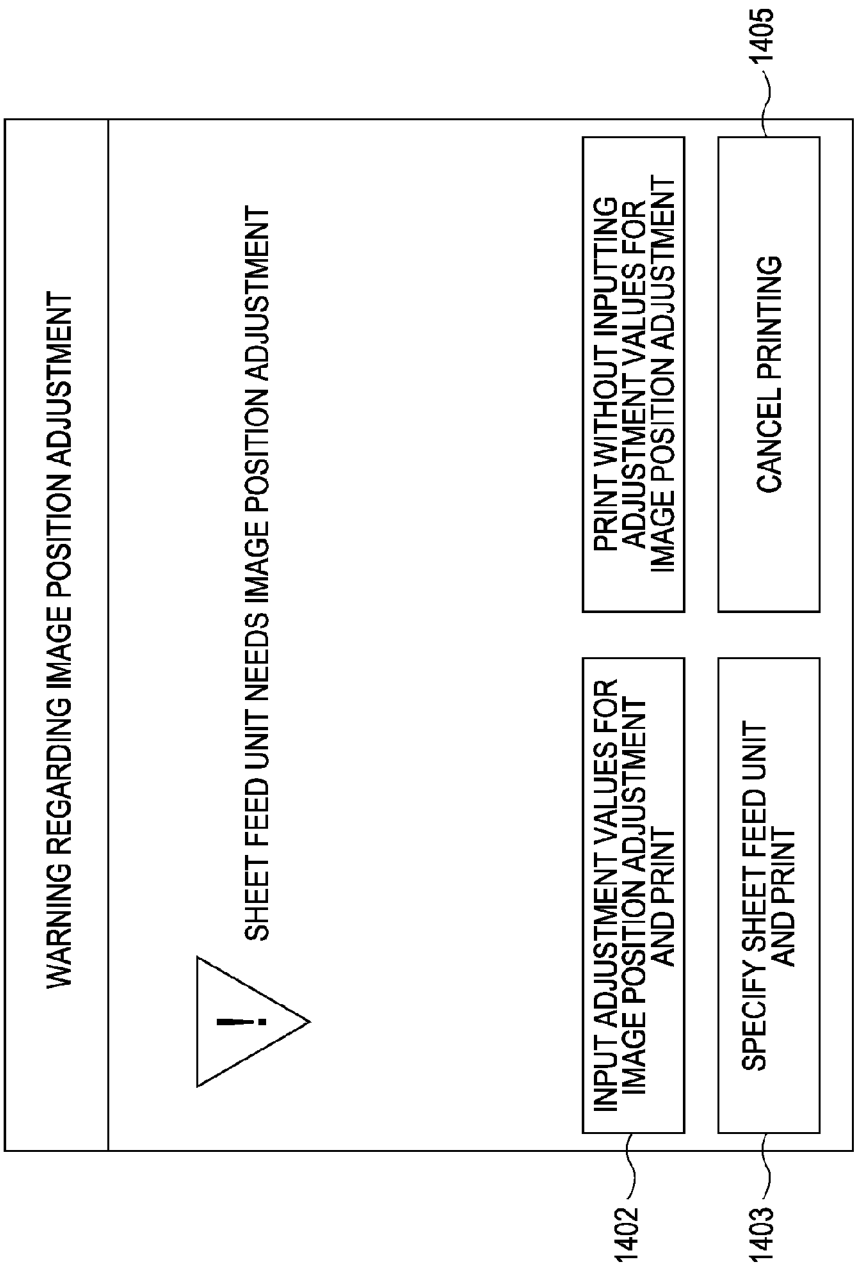
FIG. 14 is a diagram for describing a screen displayed on the operating unit to be controlled in the embodiment.

In the event that the processing of the flowchart in FIG. 16 is performed for all of the sheet feed units which can serve as candidates for the sheet feed unit from which sheets are to be fed, but printing cannot be performed, the control unit 205 displays a screen such as shown in FIG. 14, for example, on the operating unit 204.

FIG. 14 shows a screen displaying a warning on the operating unit, to prompt the user to perform image position adjustment. In this screen, upon an "input adjustment values for image position adjustment and print" button 1402 being pressed, the control unit 205 displays an image position adjustment screen such as the screen 1201 shown in FIG. 12 on the operating unit 204. The user can input adjustment values for image position adjustment from this screen. The control unit 205 executes printing based on the input adjustment values.

In the event that a "print without inputting adjustment values for image position adjustment" button 1604 being pressed, the image position adjustment screen such as shown as screen 1201 is not displayed, and the control unit 205 automatically takes an arbitrary one of the sheet feed unit candidates as the sheet feed unit from which sheets are to be fed. The control unit 205 then executes printing based on the first adjustment values set for that sheet feed unit. In the event that no adjustment values have ever been input to the sheet feed unit in the past, an error message is displayed, and then the screen shown in FIG. 14 is displayed again.

In the event that a "specify sheet feed unit and print" button 1403 is pressed, a sheet feed unit selection screen for allowing the user to specify a sheet feed unit is displayed on the operating unit 204, and printing is executed sing the sheets of the sheet feed unit selected by the user by way of this screen.

In the event that a "cancel printing" button 1405 is pressed, printing according to printing instructions received form the user is not performed, and the job to be printed (a copy job or the like) is cancelled.

While an example of control shown in the flowchart in FIG. 16 has been described with reference to an example of "automatic sheet feed unit selection", the same control can be performed regarding "automatic sheet feed unit switchover" which is performed in the event of sheets in the sheet feed unit running out during printing, in the same way.

Also, while description has been made here regarding an example of a copy job, this can be applied to jobs for printing image data received via the external interface 202 as well. In this case, in the vent of instructing printing at the PC 103 of PC 104 for example, the user can select "automatic" as a condition for the sheets to be used for printing. Upon receiving a printing instruction of image data to which information has been added indicating that the sheet condition is set to "automatic", from the PC 103 of PC 104, the control unit 205 performs the above-described "automatic sheet feed unit selection". At this time, the control unit 205 determines the size of the image data that has been received, and takes a sheet feed unit in which sheets of the size that has been determined are set, as a candidate for the sheet feed unit from which sheets are to be fed. Then control unit 205 then performs the control shown in the flowchart in FIG. 16 on the candidate sheet feed unit.

Figure 13:
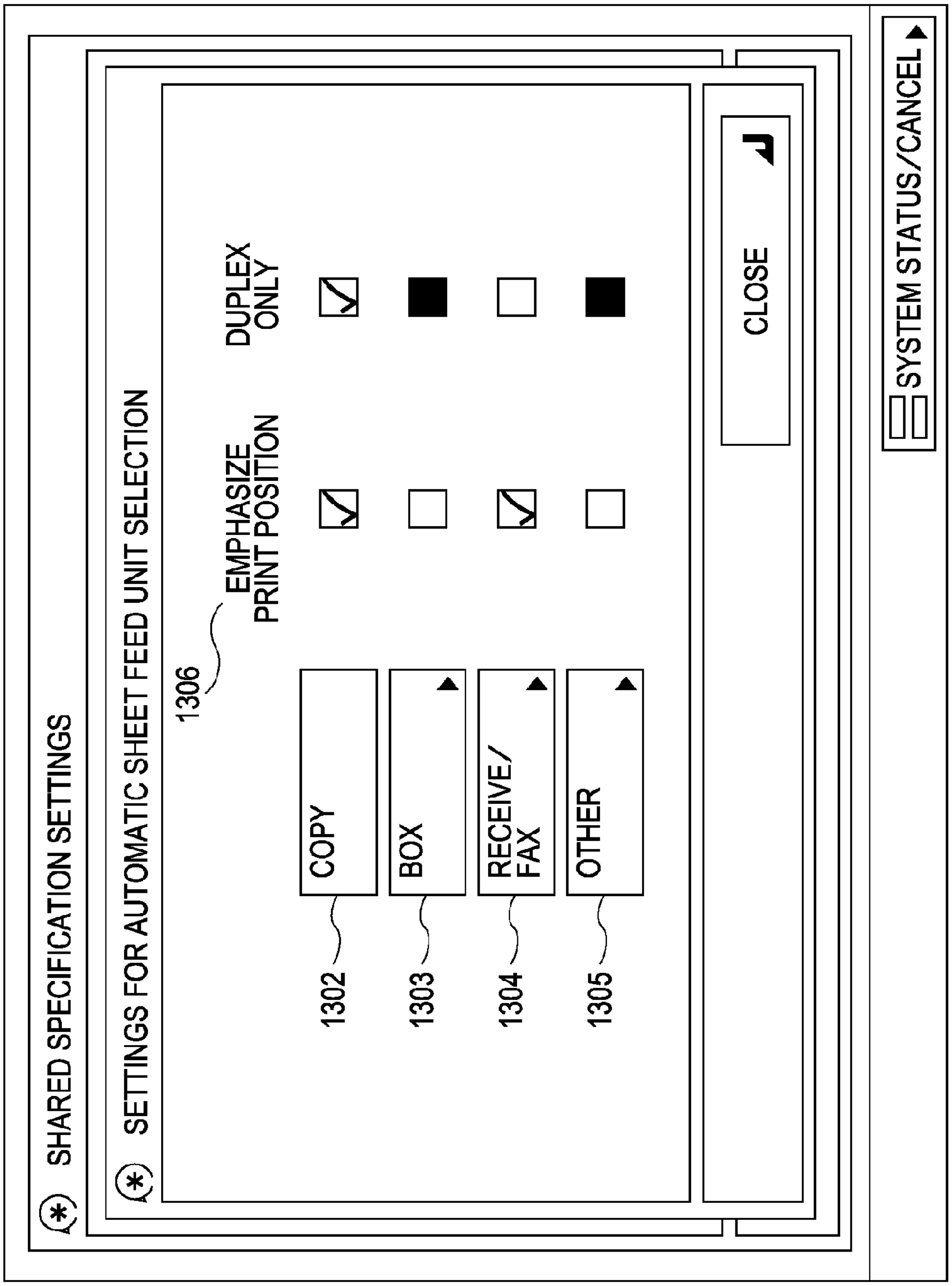
FIG. 13 is a diagram for describing a screen displayed on the operating unit to be controlled in the embodiment.

Also, the user can perform settings regarding "automatic sheet feed unit selection" of sheets using the screen shown in FIG. 13, and more particularly can perform settings relating to "automatic sheet feed unit selection" for each job type, as indicated by reference numerals 1302 through 1305, with the screen shown in FIG. 13.

For example, the user can check or uncheck "emphasize print position" checkboxes. In the event of executing a job of a job type for which an "emphasize print position" checkbox 1306 has not been checked, the control unit 205 performs control as follows. The control unit 205 arbitrarily selects a sheet feed unit in which sheets satisfying the sheet conditions specified by the user, regardless of the information in the tables in FIGS. 9 and 10. The control unit 205 then performs printing using the sheets of the selected sheet feed unit.

On the other hand, in the event of executing a job of a job type for which an "emphasize print position" checkbox 1306 has been checked, the control unit 205 performs control as follows. At the time of "automatic sheet feed unit selection" or "automatic sheet feed unit switchover", the control unit 205 performs the control shown in the flowchart in FIG. 16 regarding candidates for the sheet feed unit in which sheets satisfying the conditions specified by the user are set.

Also, in the event that the "emphasize print position" checkbox has been checked, the user can set a "duplex only" checkbox as an auxiliary setting. In the event that the "duplex only" checkbox has been checked, the control unit 205 performs the following control only for executing jobs for which duplex printing has been specified. Specifically, at the time of "automatic sheet feed unit selection" or "automatic sheet feed unit switchover", the control unit 205 performs the control shown in the flowchart in FIG. 16 regarding candidates for the sheet feed unit in which sheets satisfying the conditions specified by the user are set. In other words, for simplex printing jobs, at the time of "automatic sheet feed unit selection" or "automatic sheet feed unit switchover", the control unit 205 arbitrarily selects a sheet feed unit in which sheets satisfying the sheet conditions specified by the user, and performs printing.

With the present embodiment, in the event that the state of the sheet feed unit serving as a candidate for the sheet feed unit from which sheets are to be fed is "Not Opened" or "Opened", usage of the sheet feed unit is permitted. Also, while description has been made regarding an example wherein use of the sheet feed unit is forbidden in the event that the state is "Changed", the following control may be performed.

For example, even in the event that the state of the candidate sheet feed unit is "Changed", use of the sheet feed unit is permitted as long as adjustment values have been reused. Thus, even in the event that adjustment values have not been input following changing of the size or type of sheets held in the sheet feed unit, printing with productivity as a priority can be performed by reusing adjustment history of another sheet feed unit to perform printing.

Also, instead of performing the control shown in the flowchart in FIG. 16 on a sheet feed unit candidate satisfying the sheet conditions, the control unit 205 may perform the following control. The control unit 205 may make reference to the numerals of the adjustment state space in the column 1005 regarding the sheet feed unit candidate, and select sheet feed units with larger numbers with priority, and executing printing using sheets of the selected sheet feed unit. Accordingly, the control unit 205 can use an adjusted sheet feed unit (value "3" in column 1005) with priority over a sheet feed unit which needs adjustment (value "1" in column 1005). Also, the control unit 205 can use an adjusted sheet feed unit (value "3" in column 1005) with priority over a sheet feed unit with reused adjustment values (value "2" in column 1005). Thus, highly precise image position adjustment can be realized.

Also, even in the event that the control unit 205 cannot find an adjusted sheet feed unit (value "3" in column 1005), but can find a sheet feed unit with reused adjustment values (value "2" in column 1005), image adjustment is performed based on the adjustment values reused for that sheet feed unit so as to perform printing. Thus, printing with productivity as a priority can be performed.

In the event that there are only sheet feed units with "1" in the adjustment state space, the user can be presented with a screen such as shown in FIG. 14 and prompted for instructions.

Due to the above processing, highly precise print position output can be easily realized while reducing the load on the user for effectively using image position adjustment, thereby improving the quality of printed articles.

Second Embodiment

There are cases, for example, wherein the moisture content of the sheets changes due to change in humidity, resulting in change in the image position being printed. Accordingly, newer adjustment values are more desirable for reuse for the sheet feed units; the newer the better.

The control unit 205 first attempts reuse of adjustment history of the same sheet feed unit, and in the event that there are only old adjustment values in the adjustment history of the same sheet feed unit, attempts reuse of newer adjustment values from the adjustment history of another sheet feed unit. This control is based on the fact that environmental factors changing from time to time, such as ambient humidity, affect shifting of image position even more than mechanical factors due to the feeding operations of each sheet feed unit.

Figure 15:
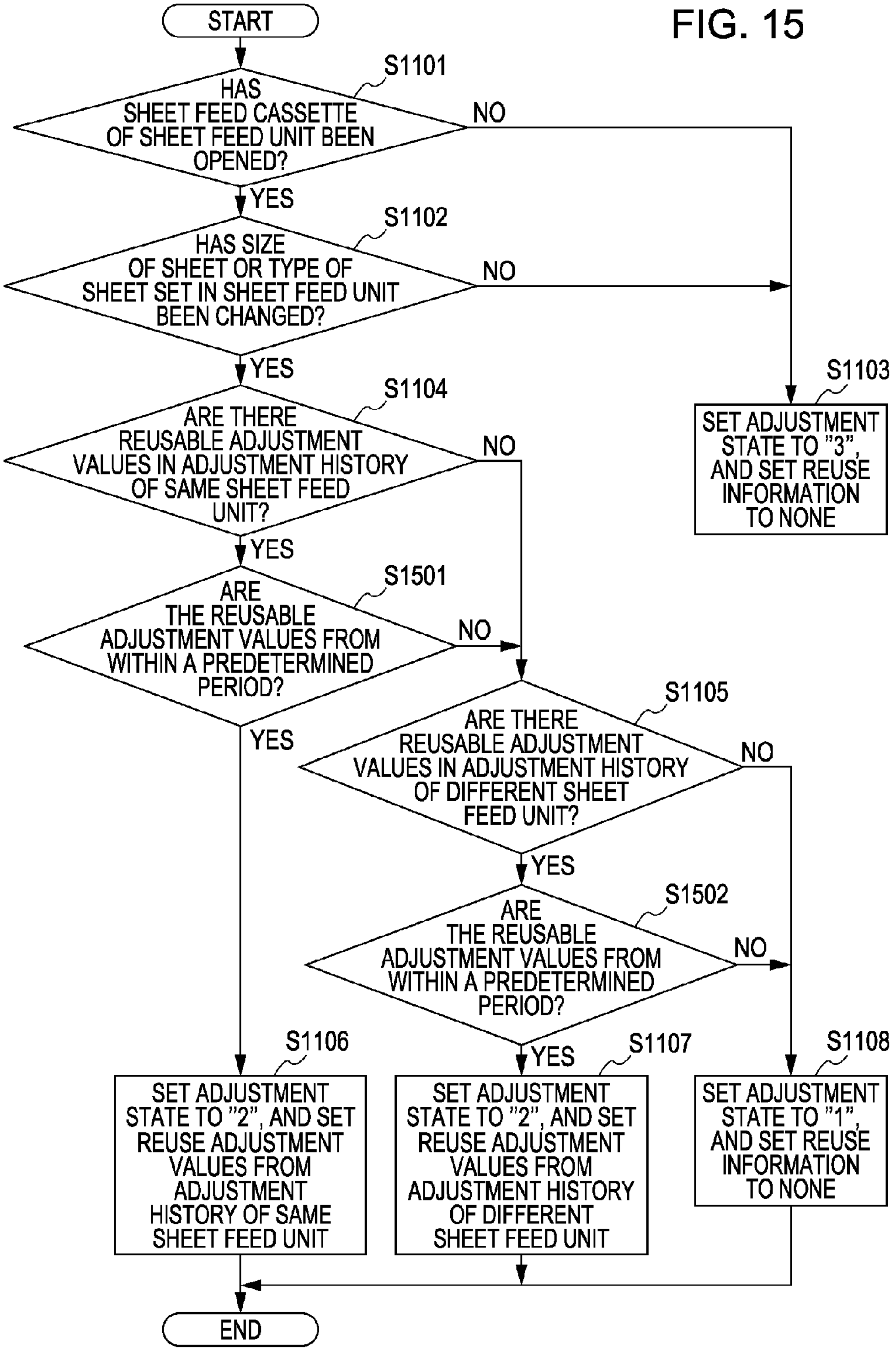
FIG. 15 is a flowchart for describing an example of control procedures according to the embodiment.

With the second embodiment, description will be made regarding an example wherein image position adjustment can be performed taking into consideration environmental factors such as humidity, with reference to the flowchart shown in FIG. 15. Note that FIG. 15 replaces the flowchart in FIG. 11 described in the first embodiment. Configurations and control except than that shown in FIG. 15 is almost the same as that described with the first embodiment, so description thereof will be omitted. Also, of the steps shown in FIG. 15, the portions which are the same as those in FIG. 11 will be denoted with the same step numbers, and description thereof will be omitted.

In step S1104, in the event that determination is made that there are reusable adjustment values in the adjustment history of the same sheet feed unit, the flow proceeds to step S1501, and in the event that determination is made that there are no reusable adjustment values in the adjustment history of the same sheet feed unit, the flow proceeds to step S1505.

In step S1501, the control unit 205 determines whether or not there are reusable adjustment values within a predetermined period (e.g., within one day). In the event that there is such, the flow proceeds to step S1106, otherwise, the flow proceeds to step S1105.

In the event that determination is made in step S1105 that there are reusable adjustment values in the adjustment history of another sheet feed unit, the flow proceeds to step S1502, and in the event that determination is made that there are no reusable adjustment values in the adjustment history of another sheet feed unit, the flow proceeds to step S1108.

In step S1502, the control unit 205 determines whether or not there are reusable adjustment values within a predetermined period (e.g., within 12 hours). In the event that there is such, the flow proceeds to step S1107, otherwise, the flow proceeds to step S1108.

Note that the above predetermined period may be a preset value, or may be set by the user.

Such control enables image position adjustment taking into consideration environmental factors changing from time to time such as humidity. Also, in the event that there are only old adjustment values in the same sheet feed unit or in other sheet feed units, the user is prompted to input appropriate adjustment values, thereby performing appropriate image position adjustment.

In the above embodiments, description has been made regarding an example of image position adjustment for each sheet feed unit, but the present invention is not restricted to this, and control may be performed for each sheet feed unit regarding image quality adjustment, toner density adjustment, and other sorts of adjustment, for each sheet feed unit. In such cases, reusable information might include parameters or the like indicating toner density for adjusting image quality, for example.

The image processing apparatus 101 described with the above embodiments has been described with an example wherein the control unit 205 displays a screen on the touch panel unit 401, but a configuration may be made wherein the touch panel unit 401 has its own control unit and display memory. In this case, the control unit 205 sends display data to the display memory which the touch panel unit 401 is provided with, and the control unit which the touch panel unit 401 is provided with performs display based on the display data stored in the display memory.

An arrangement may be made wherein the functions according to the embodiment shown in the drawings are carried out by a host computer (e.g., PC 103 or PC 104). In this case, data for displaying the operating screens the same as the operating screens described with the embodiments including each operating screen is installed from an external source, so that various types of user interface screens can be provided on the display unit of the host computer. With such a configuration, the present invention is applicable to cases wherein an information group including a program is supplied to an output apparatus from a recording medium such as CD-ROM or flash memory or a floppy disk, or from an external storage medium via a network.

A data processing program which is readable by an image processing apparatus according to an exemplary embodiment of the present invention is described below, with reference to a memory map illustrated in FIG. 14.

FIG. 14 illustrates a memory map of a storage medium that stores various data processing programs that are readable by an image processing apparatus according to an exemplary embodiment of the present invention.

In addition, although not illustrated, information for managing software stored in the storage medium, for example, version or creator, and information relying on an operating system (OS) of a computer for reading out the software (e.g., programs, icons for identifying the programs, etc.) can be stored in the storage medium.

Furthermore, data ancillary to the various programs is managed in directories of the storage medium. In addition, programs for installing the various programs in computers or for decompressing compressed programs can be stored in the storage medium.

The control procedures illustrated in the flowcharts of FIGS. 11, 15, and 16 can be implemented by a host computer executing a program installed from an external source. A group of information including a program can be supplied to an information processing apparatus from a storage device such as a compact disk-read-only memory (CD-ROM), flash memory, or floppy disk, or from an external storage device through a network.

As described above, the features of the present invention are realized by supplying a storage medium in which is recorded program code for software for realizing the functions of the above embodiments to a system or apparatus, and a computer (CPU, MPU, etc.) thereof reading out and executing the program code stored therein. In this case, the program code itself read out from the storage medium realizes new functions of the present invention, and the computer-readable storage medium itself storing the program code makes up the present invention.

Accordingly, the program format is not restricted in any way as long as it functions as a program, regardless of whether it is object code, a program executed by an interpreter, script data to be supplied to an OS (operating system), or the like.

Examples of storage media for supplying the program include flexible disks, hard disks, optical disks, magneto-optical disks, MOs, CD-ROMs, CD-Rs, CD-RWs, magnetic tape, nonvolatile memory cards, ROM, DVDs, and so forth. In this case, the program code itself read out from the storage medium realizes new functions of the present invention, and the computer-readable storage medium itself storing the program code makes up the present invention.

As another method of supplying the program, a homepage on the Internet may be accessed using a browser of the client completer, and the computer program according to the present invention can be downloaded from the homepage to a recording medium such as a hard disk or the like. Alternatively, a compressed file having an automatic installation function may be downloaded to a recording medium such as a hard disk or the like. This may also be realized by dividing the program code making up the program according to the present invention into multiple files, with each being downloaded from different homepages. That is to say, a WWW server, ftp server, etc., for downloading multiple program files for realizing the functional processing of the present invention are also included in the scope of the present invention.

Also, the program according to the present invention may be encrypted and stored in a storage medium such as CD-ROM or the like and distributed to users. In this case, only users who have cleared certain conditions can download a decryption key form a homepage via the Internet, so as to install the encrypted program in a computer so as to be executed.

The present invention is not restricted to cases wherein computer-readable program code is executed, and also can be realized by arrangements wherein an operating system running on the computer performs part or all of the actual processing thereof.

Further, a method may be made wherein the program read out from the recording medium is written into memory associated with a function expansion unit which is connected to the computer or a function expansion board inserted in the computer. Based on the program instructions, a CPU or the like associated with the function expansion board or function expansion unit can perform part or all of the actual processing.

Also, the present invention may be applied to a system configured of multiple apparatuses, or a single apparatus. Further, it is needless to say that the present invention can be applied to cases realized by supplying the program to a system or apparatus. In this case, the system or apparatus can obtain the advantages of the present invention by reading out the program in the form of software for achieving the present invention from the storage medium in which is has been stored, to the system or apparatus.

The present invention is not restricted to the above embodiments; rather various modifications (including organic combination of the embodiments) based on the spirit of the present invention, without departing from the scope of the present invention. For example, while the control unit 205 within the printing apparatus 100 has been described as being a primary component, a configuration may be made wherein part or all of the various types of control can be executed by an external controller included in an external apparatus in a separate housing from the printing apparatus 100.

While the present invention has been described by way of embodiments and examples, it will be clearly understood to one skilled in the art that the present invention is not restricted to the embodiments, and that various modifications may be made without departing from the spirit and scope of the invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-175296 filed Jul. 3, 2007, which is hereby incorporated by reference herein in its entirety.

What is claimed is:

1. A printing apparatus for causing a printing unit to print an image on a sheet fed from a sheet storage unit, comprising:
- an accepting unit configured to accept input of an adjustment value for image adjustment;
- a print control unit configured to cause said printing unit to print an image according to the adjustment value accepted by said accepting unit;
- a detecting unit configured to detect that a size of the sheet stored in said sheet storage unit has been changed; and
- a prompting unit configured to, in a case where input of the adjustment value is not accepted by said accepting unit after said detecting unit detects that the size of the sheet stored in said sheet storage unit has been changed, prompt input of the adjustment value.

2. The printing apparatus according to claim 1, further comprising:
- a plurality of said sheet storage units;
- wherein said accepting unit accepts input of an adjustment value for image adjustment for a sheet stored in each of said plurality of sheet storage units; and
- wherein said prompting unit prompts input of the adjustment value for at least one of said plurality of sheet storage units.

3. A printing apparatus for causing a printing unit to print an image on a sheet fed from a sheet storage unit, comprising:
- an accepting unit configured to accept input of an adjustment value for image adjustment;
- a print control unit configured to cause said printing unit to print an image according to the adjustment value accepted by said accepting unit;
- a detecting unit configured to detect that a type of the sheet stored in said sheet storage unit has been changed; and
- a prompting unit configured to, in a case where input of the adjustment value is not accepted by said accepting unit after said detecting unit detects that the type of the sheet stored in said sheet storage unit has been changed, prompt input of the adjustment value.

4. A printing apparatus for causing a printing unit to print an image on a sheet fed from any of a plurality of sheet storage units, comprising:

an accepting unit configured to accept input of an adjustment value for image adjustment for a sheet stored in each of said plurality of sheet storage units;

a selecting unit configured to automatically select, from said plurality of sheet storage units, a sheet storage unit from which sheets are to be fed so as to be printed upon by said printing unit, based on information of said sheet; and a print control unit configured to cause said printing unit to print an image according to an adjustment value accepted by said accepting unit, using a sheet of the sheet storage unit selected by said selecting unit;

wherein said selecting unit automatically selects a sheet storage unit for which input of the adjustment value has been completed.

5. The printing apparatus according to claim 4, further comprising:

a control unit configured to, in a case where said selecting unit selects a sheet storage unit, control such that a sheet storage unit for which input of the adjustment value has been completed is selected and a sheet storage unit for which input of the adjustment value is necessary is not selected.

6. The printing apparatus according to claim 4, wherein in a case where there is no sheet in the sheet storage unit being used for the printing during printing by said printing unit, said selecting unit selects another sheet storage unit from said sheet storage units, based on information of said sheet.

7. The printing apparatus according to claim 4, further comprising:

a size change detecting unit configured to detect that a size of a sheet stored in said sheet storage unit has been changed;

wherein a sheet storage unit for which said adjustment is necessary is a sheet storage unit for which input of the adjustment value is not accepted by said accepting unit for said sheet storage unit after said size change detecting unit detects that the size of the sheet stored in said sheet storage unit has been changed.

8. The printing apparatus according to claim 4, further comprising:

a type change detecting unit configured to detect that a type of a sheet stored in said sheet storage unit has been changed;

wherein a sheet storage unit for which said adjustment is necessary is a sheet storage unit for which input of the adjustment value is not accepted by said accepting unit for said sheet storage unit after said type change detecting unit detects that the type of the sheet stored in said sheet storage unit has been changed.

9. The printing apparatus according to claim 4, wherein an adjustment value which said accepting unit has accepted for a certain sheet storage unit of said plurality of sheet storage units can be reused as an adjustment value for another sheet storage unit of said plurality of sheet storage units.

10. The printing apparatus according to claim 4, wherein an adjustment value accepted by said accepting unit regarding a certain sheet storage unit of said plurality of sheet storage units can be reused as an adjustment value for another sheet storage unit storing sheets of the same size and type as the size and type of the sheet stored in said sheet storage unit.

11. A control method for controlling a printing apparatus for causing a printing unit to print an image on a sheet fed from a sheet storage unit, comprising:

accepting input of an adjustment value for image adjustment;

causing said printing unit to print an image according to the accepted adjustment value;

detecting that a size of the sheet stored in said sheet storage unit has been changed;

in a case where input of the adjustment value is not accepted after it is detected that the size of the sheet stored in said sheet storage unit has been changed, prompting input of the adjustment value.

12. The control method according to claim 11, wherein said printing apparatus has a plurality of said sheet storage units; and wherein input of an adjustment value is accepted for image adjustment for a sheet stored in each of said plurality of sheet storage units; and wherein input is prompted for the adjustment value for at least one of said plurality of sheet storage units.

13. A control method for controlling a printing apparatus for causing a printing unit to print an image on a sheet fed from a sheet storage unit, comprising:

accepting input of an adjustment value for image adjustment;

causing said printing unit to print an image according to the accepted adjustment value;

detecting that a type of the sheet stored in said sheet storage unit has been changed;

in a case where input of the adjustment value is not accepted after it is detected that the type of the sheet stored in said sheet storage unit has been changed, prompting input of the adjustment value.

14. A control method for causing a printing unit to print an image on a sheet fed from any of a plurality of sheet storage units, comprising:

accepting input of an adjustment value for image adjustment for a sheet stored in each of said plurality of sheet storage units;

automatically selecting, from said plurality of sheet storage units, a sheet storage unit from which sheets are to be fed so as to be printed upon by said printing unit, based on information of said sheet; and causing said printing unit to print an image according to said accepted an adjustment value, using a sheet of said selected sheet storage unit;

wherein a sheet storage unit for which input of the adjustment value has been completed is automatically selected.

15. The control method according to claim 14, further comprising:

controlling, in a case where said selecting unit selects a sheet storage unit, such that a sheet storage unit for which input of the adjustment value has been completed is selected and a sheet storage unit for which input of the adjustment value is necessary is not selected.

16. The control method according to claim 14, wherein in a case where there is no sheet in the sheet storage unit being used for the printing during printing by said printing unit, another sheet storage unit is selected from said sheet storage units, based on information of said sheet.

17. The control method according to claim 14, further comprising:

detecting that a size of a sheet stored in said sheet storage unit has been changed;

wherein a sheet storage unit for which said adjustment is necessary is a sheet storage unit for which input of the adjustment value is not accepted for said sheet storage unit after it is detected that the size of the sheet stored in said sheet storage unit has been changed.

18. The control method according to claim 14, further comprising:

detecting that a type of a sheet stored in said sheet storage unit has been changed;

wherein a sheet storage unit for which said adjustment is necessary is a sheet storage unit for which input of the adjustment value is not accepted for said sheet storage unit after it is detected that the type of the sheet stored in said sheet storage unit has been changed.

19. The control method according to claim 14, wherein the accepted adjustment value for a certain sheet storage unit of said plurality of sheet storage units can be reused as an adjustment value for another sheet storage unit of said plurality of sheet storage units.

20. The control method according to claim 14, wherein the accepted adjustment value regarding a certain sheet storage unit of said plurality of sheet storage units can be reused as an adjustment value for another sheet storage unit storing sheets of the same size and type as the size and type of the sheet stored in said sheet storage unit.

21. A non-transitory computer-readable storage medium storing a program for controlling a printing apparatus so as to cause a printing unit to print an image on a sheet fed from a sheet storage unit, said program configured to execute a method comprising:

accepting input of an adjustment value for image adjustment;

causing said printing unit to print an image according to the accepted adjustment value;

detecting that a size of the sheet stored in said sheet storage unit has been changed;

prompting, in a case where input of the adjustment value is not accepted after it is detected that the size of the sheet stored in said sheet storage unit has been changed, input of the adjustment value.

22. A non-transitory computer-readable storage medium storing a program for causing a printing unit to print an image on a sheet fed from any of a plurality of sheet storage units, said program configured to execute a method comprising:

accepting input of an adjustment value for image adjustment for a sheet stored in each of said plurality of sheet storage units;

automatically selecting, from said plurality of sheet storage units, a sheet storage unit from which sheets are to be fed so as to be printed upon by said printing unit, based on information of the sheet; and causing said printing unit to print an image according to the accepted adjustment value, using a sheet of said selected sheet storage unit;

wherein a sheet storage unit for which input of the adjustment value has been completed is automatically selected.

* * * * *